(12) United States Patent
Dennison et al.

(10) Patent No.: US 8,946,606 B1
(45) Date of Patent: Feb. 3, 2015

(54) DETERMINING ANGULAR RATE FOR LINE-OF-SIGHT TO A MOVING OBJECT, WITH A BODY-FIXED IMAGING SENSOR

(75) Inventors: John Charles Dennison, Healdsburg, CA (US); Clayton Houston Davis, Haymarket, VA (US); Brian Edward Frazier, Santa Rosa, CA (US)

(73) Assignee: Arete Associates, Northridge, CA (US)

( * ) Notice: Subject to any disclaimer, the term of this patent is extended or adjusted under 35 U.S.C. 154(b) by 316 days.

(21) Appl. No.: 12/660,490

(22) Filed: Feb. 26, 2010

Related U.S. Application Data

(63) Continuation-in-part of application No. 12/383,638, filed on Mar. 25, 2009.

(60) Provisional application No. 61/208,830, filed on Feb. 27, 2009, provisional application No. 61/072,028, filed on Mar. 26, 2008.

(51) Int. Cl.
| | |
|---|---|
| *F41G 7/22* | (2006.01) |
| *F41G 9/00* | (2006.01) |
| *F42B 15/01* | (2006.01) |
| *F41G 7/00* | (2006.01) |
| *F42B 15/00* | (2006.01) |

(52) U.S. Cl.
USPC ......... 244/3.16; 244/3.1; 244/3.15; 244/3.23; 382/100; 382/103

(58) Field of Classification Search
USPC .......... 244/3.1–3.19, 3.2–3.23; 382/100, 103, 382/141, 181, 209, 216; 342/52–55, 61–67, 342/73–81, 175, 195
See application file for complete search history.

(56) References Cited

U.S. PATENT DOCUMENTS

| | | | | |
|---|---|---|---|---|
| 4,497,065 A | * | 1/1985 | Tisdale et al. | 382/103 |
| 4,529,151 A | * | 7/1985 | Skarman | 244/3.15 |
| 4,739,401 A | * | 4/1988 | Sacks et al. | 382/103 |
| 4,750,688 A | * | 6/1988 | Davies | 244/3.11 |
| 5,134,661 A | * | 7/1992 | Reinsch | 382/100 |
| 5,303,878 A | * | 4/1994 | McWilliams et al. | 244/3.15 |
| 5,332,176 A | * | 7/1994 | Wootton et al. | 244/3.11 |
| 5,669,579 A | * | 9/1997 | Zacharias | 244/3.15 |
| 5,960,097 A | * | 9/1999 | Pfeiffer et al. | 382/103 |
| 6,043,867 A | * | 3/2000 | Saban | 244/3.17 |
| 6,175,644 B1 | * | 1/2001 | Scola et al. | 382/141 |

(Continued)

*Primary Examiner* — Bernarr Gregory
(74) *Attorney, Agent, or Firm* — Furman IP Law

(57) ABSTRACT

Apparatus/method estimate LOS rotation, to track, approach, pursue, intercept or avoid objects. Vehicle-fixed imagers approach/recede-from objects, recording image series with background. Computations, from images exclusively, estimate rotation vs. the vehicle, applying the estimate. Preferably, recording/estimating provide proportional navigation; scan mirrors extend strapdown-sensor FOR; applying includes measuring "range rate over range", exclusively from interimage optical flow, using results to optimize proportional-navigation loop gain; estimating includes evaluating interframe optical flow, preregistering roughly as first approximation, selecting sequence anchor points, and applying a second, finer technique developing output registration that's a coordinate translation, aligning inertial surroundings. The approximation operates optical flow with efficient embedded registration/mapping, applying a homography matrix to nearby imagery. Alternatively, inexpensive low-quality inertial sensors establish preregistration, deriving a homography matrix. When contrast in the object direction is inadequate, dual sensors yield accurate virtual imaging with an object centroid superposed into background.

12 Claims, 38 Drawing Sheets

(56) References Cited

U.S. PATENT DOCUMENTS

| | | | |
|---|---|---|---|
| 6,175,652 B1* | 1/2001 | Jacobson et al. | 382/216 |
| 6,179,246 B1* | 1/2001 | Fisel et al. | 244/3.16 |
| 6,262,680 B1* | 7/2001 | Muto | 244/3.11 |
| 6,421,116 B1* | 7/2002 | Schilli et al. | 244/3.16 |
| 7,292,711 B2* | 11/2007 | Kiraly et al. | 382/103 |
| 7,397,970 B2* | 7/2008 | Han et al. | 382/103 |
| 7,444,002 B2* | 10/2008 | Teku et al. | 382/103 |
| 7,463,753 B2* | 12/2008 | Williams et al. | 382/103 |
| 7,881,495 B2* | 2/2011 | Williams et al. | 382/103 |
| 7,912,247 B2* | 3/2011 | Williams et al. | 382/103 |
| 8,229,163 B2* | 7/2012 | Coleman et al. | 382/103 |
| 2005/0008193 A1* | 1/2005 | Toyama | 382/103 |
| 2006/0120590 A1* | 6/2006 | Han et al. | 382/103 |

* cited by examiner

| Camera and Lens Inputs | Aptina 10MPEO Sensor |
|---|---|
| Lens Part Number UKOptics.com | VC-53 |
| Wavelength (mm) | 0.555 |
| Aperture (mm) | 2.65 |
| Focal Length (mm) | 5.3 |
| Pixel Pitch ($\mu m$) | 1.67 |
| #Horizontal Pixels | 3856.0 |
| #Vertical Pixels | 2764.0 |
| Equiv. Target Area ($m^2$) | 1.1 |
| Rayleigh Criteria ($\mu rads$) | 255.5 |
| F/# | 2.0 |
| IFOV ($\mu rads$) | 315.1 |
| HFOR (deg) | 69.61 |
| VFOR (deg) | 49.90 |
| HFOV (640 pixels) | 11.55 |
| VFOV (480 pixels) | 8.67 |
| Pdetection-50% (km) | 2.4 |
| Precognition-50% (km) | 0.6 |
| Pidentification-50% (km) | 0.3 |

US 8,946,606 B1

DETERMINING ANGULAR RATE FOR LINE-OF-SIGHT TO A MOVING OBJECT, WITH A BODY-FIXED IMAGING SENSOR

RELATION BACK

This patent document claims priority of U.S. Provisional Patent Application 61/208,830, filed Feb. 27, 2009. The present patent document is also a continuation-in-part, and accordingly claims priority, of non-provisional U.S. patent application Ser. No. 12/383,638, filed Mar. 25, 2009—which in turn claimed priority of U.S. Provisional Patent Application 61/072,028, filed Mar. 26, 2008. We have substantially copied into this present document certain parts of the precursor '638 application, and re-serve the right to likewise copy hereinto all or any part(s) of any of the three applications just mentioned.

FIELD OF THE INVENTION

Our invention relates generally to methods for guidance and control of a vehicle that is intended to rendezvous with or intercept an object—usually but not necessarily an object that is moving—and more specifically to such methods in which the control function is of a type known as "proportional navigation". A fundamental principle of such navigation is that two vehicles or objects are on a collision course if the inertial line-of-sight (hereinafter "LOS") vector is constant in compass direction ("bearing").

This condition can be satisfied if the pursuer has an acceleration that is proportional to the LOS rate. Measurement of the LOS rate is commonly used in e.g. missile applications, for use in proportional navigation. Proportional navigation commands an acceleration, perpendicular to the LOS, that is proportional to the LOS rate. If the proportionality constant is correctly chosen, then proportional navigation will drive the inertial LOS rate to zero, inducing a collision course.

Mathematics and descriptions in this field are essentially the same whether the vehicles or objects are benign or are hostile—e.g. whether the purpose is a rendezvous and gentle assembly of modules for a cooperative space station, or in fact a violent collision with and explosive demolition of a menacing enemy weapon. Our invention is valuable in all such environments.

BACKGROUND

So-called "homing" devices rely on the ability to intercept moving objects of interest (e.g. targets). For weapons, for instance typical electrooptical ("EO") or infrared ("IR") homing vehicles such as tactical missiles, the ability to intercept an object is heretofore best realized with quite expensive inertial-rate sensors and precision-gimbal modules.

These inertial-rate and (if gimbals are present) precision linear-position sensors are used to measure the LOS angular rotation rate (commonly called the "LOS rate") between the homing vehicle and an object. If of low cost, such sensors are not adequate for high-performance interception of moving, accelerating objects: such pursuit requires high-bandwidth guidance, which in turn is precluded by parasitic body coupling and measurement noise.

Some workers in this field have tried to derive the angular LOS rate from imaging sensors. All of their imaging techniques, however, also require knowledge of the sensor's own inertial state (e.g., speed and body rates). Hence these efforts fail to escape or mitigate the above-discussed requirement for very costly inertial-rate sensors or precise gimbals.

Some such imaging systems employ gimbaled camera systems; others, so-called "strapdown" imaging sensors—that is, imaging sensors carried by and fixed with respect to a vehicle. Many of these researchers approach the problem with optimal estimation techniques. Others use camera-pixel-specific information to support the development of proportional navigation guidance.

To the best of our knowledge, accordingly, no prior imaging-sensor method has succeeded in maintaining high-bandwidth guidance but at very low cost. Yet high-bandwidth guidance is essentially an absolute requirement for high-performance interception of moving, accelerating objects. Although prior artisans in this field are responsible for remarkable accomplishments, they have left considerable room for improvement.

BRIEF SUMMARY OF THE DISCLOSURE

Our invention provides exactly such improvement. The invention has several main aspects, or facets, which generally speaking can be practiced independently of one another; however, with certain exceptions that will be clear to a person skilled in this field, we prefer to practice all the facets or aspects in combination together.

In preferred embodiments of its first major independent facet or aspect, the invention is a method for estimating LOS rotation rate for use in tracking, approaching, pursuing, intercepting, or avoiding an object. The method includes the step of recording a series of images of the object together with a background scene. This step is performed with an imaging sensor fixed to a vehicle that is approaching or receding from the object.

The method also includes the step of estimating LOS rotation rate of the object relative to the vehicle. This step is performed based upon computations made from the images exclusively, with no direct information about inertial angular body rate or gimbal angle.

Another step is applying the estimated LOS rotation rate to track, approach, pursue, intercept or avoid the object. The foregoing may represent a description or definition of the first aspect or facet of the invention in its broadest or most general form. Even as couched in these broad terms, however, it can be seen that this facet of the invention importantly advances the art.

In particular, since inertial angular body rate is not needed and not determined, this first aspect of the invention entirely avoids the previously mentioned high cost, weight and bulk of high-bandwidth measurement with inertial sensors. The image-collecting sensors used instead are much less costly, far lighter, and smaller.

Although the first major aspect of the invention thus significantly advances the art, nevertheless to optimize enjoyment of its benefits preferably the invention is practiced in conjunction with certain additional features or characteristics. In particular, preferably the image-recording and rate-estimating steps provide proportional navigation.

Another preference is that the recording step include operating a scan mirror to extend the total field of regard (FOR) of the sensor. Notwithstanding the mirror-operating step, this form of the invention still determines the LOS from the images exclusively.

Yet another preference is that the recording step include operating the sensor as a strapdown sensor on the vehicle.

In still another preference, the applying step further includes also incorporating measurement of "range rate over range" determined exclusively from optical flow as between successive images. In this case the measured "range rate over range" is applied, in combination with the LOS rotation rate, to optimize proportional-navigation guidance loop gain.

A still-further preference is that the estimating step also include the substeps of:
- evaluating the optical flow between successive frames;
- establishing a rough image registration by applying a first image-registration technique—which is relatively more approximate;
- next selecting anchor points for image sequences; and
- then applying a second, relatively finer image-registration technique to establish an output image-registration solution. The latter established "registration solution" is a coordinate translation that is needed to align inertial surroundings of the object.

If the foregoing basic four-step preference is observed, then we also a subpreference namely, that the first image-registration technique includes operating an optical-flow procedure with efficient embedded registration and mapping; and applying a resulting homography matrix to imagery around the object.

In preferred embodiments of its second major independent facet or aspect, as in the first aspect, the invention is a method for estimating LOS rotation rate for use in tracking, approaching, pursuing, intercepting, or avoiding an object. This method, however, includes the step of operating at least one inexpensive and low-quality inertial rate sensor, to establish a first relatively rough but efficient embedded image registration and mapping.

It also includes the step of—based on the first registration—generating a homography matrix. It further includes the step of recording a series of images of the object, together with a background. As before, this recording step is performed with an imaging sensor fixed to a vehicle that is approaching or receding from the object.

Another step is estimating LOS rotation rate of the object relative to the vehicle. As before, this step is based on computations made from the images exclusively, with no direct information about gimbal angle.

In fact this entire method of the second aspect of the invention is performed with no direct information about inertial angular body rate—except as stated in the sensor-operating step above, i.e. using an inertial rate sensor that is inexpensive and of low quality. For purposes of this document it is to be understood that an inertial rate sensor which is "inexpensive and of low quality" is a device costing less than $500, in dollars of the year 2010. By way of comparison higher-quality sensors (high-bandwidth inertial rate sensors) generally cost between $2,000 and $20,000.

The less-expensive ones also use less-precise measurement technology, such as those in microelectromechanical ("MEMS") gyros from Analog Devices or ST Microelectronics. These devices use silicon sensing to measure electrostatic resonances, whereas the more-expensive gyros use either true mechanical structure that measures Coriolis effect, or are fiberoptic devices that measure small differences in light propagation over time.

Yet another step in the second main aspect is applying the estimated LOS rotation rate to track, approach, pursue, intercept or avoid the object. In this second main facet of the invention, the estimating step further includes these substeps:
- evaluating the optical flow between successive frames,
- next selecting anchor points for image sequences; and
- then applying a second, relatively finer image-registration technique to establish an output image-registration solution.

As in the first main facet of the invention, the registration solution is a coordinate translation for aligning the inertial surroundings of the object. As will now be clear to people skilled in this field, most of the several preferences set forth above—in connection with the first main aspect are applicable to this second main aspect as well.

In preferred embodiments of its third major independent facet or aspect, the invention is apparatus for estimating LOS rotation rate for use in tracking, approaching, pursuing, intercepting or avoiding an object. The apparatus includes at least one imaging sensor fixed to a vehicle that is approaching or receding from the object.

For purposes of this third main aspect of the invention, the vehicle is not a part of the claimed apparatus. Rather, it is mentioned here only for definiteness in setting forth relationships between the vehicle and those components that are elements of the invention.

The third main facet of the invention also includes some means for controlling the at least one sensor to record a series of images of the object together with a background. It also includes some means for making computations derived exclusively from the images, with no direct information about inertial angular body rate or gimbal angle and for thereby estimating LOS rotation rate of the object relative to the vehicle. The third aspect also includes some means for applying the estimated line-of-sight rotation rate to track, approach, pursue, intercept or avoid the object.

The foregoing may represent a description or definition of the third aspect or facet of the invention in its broadest or most general form. Even as couched in these broad terms, however, it can be seen that this facet of the invention importantly advances the art. In particular, this apparatus aspect of the invention in general confers benefits that are essentially analogous to those of the earlier-described (method) aspects.

Although the third major aspect of the invention thus significantly advances the art, nevertheless to optimize enjoyment of its benefits preferably the invention is practiced in conjunction with certain additional features or characteristics. In particular, this third aspect can be used when the vehicle is approaching the object but contrast in the direction of the object is not adequate for highly accurate measurement. When this third facet of the invention is used under such conditions, a first sensor—looking forward—receives the series of images of the object and determines what pixel best represents a centroid of the object. The first sensor thereby identifies an angle of deviation from a centerline of the first sensor.

A second sensor, looking aft, receives the series of images of a background scene. The angle from the first-sensor centerline identifies a pixel in the second sensor as the object location. The first and second sensor are precisely aligned, and the apparatus includes means for applying LOS algorithms to the second-sensor imagery, substantially as if the object were actually present at the identified pixel in the second, aft sensor.

Another basic preference for the third aspect of the invention is that the sensor-controlling and computation-making means perform proportional navigation.

In preferred embodiments of its fourth major independent facet or aspect, the invention is apparatus for estimating LOS rotation rate for use in tracking, approaching, pursuing, intercepting or avoiding an object. This apparatus includes a vehicle approaching or receding from the object. Here, unlike the situation in the third aspect of the invention, the vehicle is an element of the claimed combination. The fourth aspect of the invention is otherwise substantially the same as the third aspect:

Thus the apparatus includes at least one imaging sensor fixed to the approaching or receding vehicle, and some means for controlling the sensor to record a series of images of the object together with a background. The apparatus also includes some means for making computations derived exclusively from the images, with no direct information about inertial angular body rate or gimbal angle, and for thereby estimating line-of-sight rotation rate of the object relative to the vehicle. The apparatus also includes some means for applying the estimated LOS rotation rate to track, approach, pursue, intercept or avoid the object.

Preferences applicable to the third facet of the invention are generally likewise applicable to this fourth facet.

All these principles and advantages of our invention will be still further understood and appreciated from the following detailed description, together with reference to the accompanying drawings, of which:

DETAILED DESCRIPTION OF THE PREFERRED EMBODIMENTS

Figure 1:
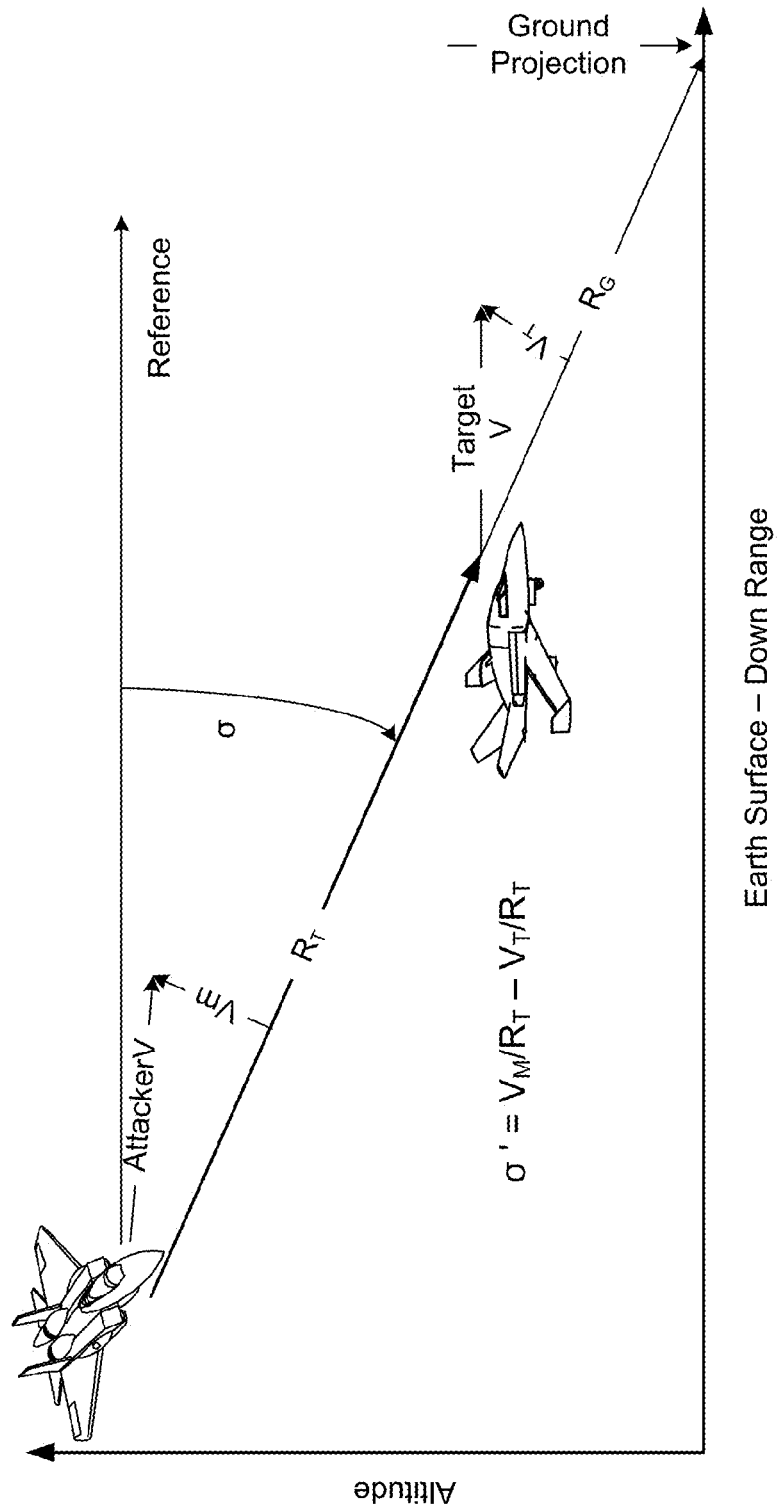
FIG. 1 is a diagram, in a single vertical plane, of air-to-air intercept geometry—defining the LOS rate needed by a guidance system for precision terminal homing.

The main characteristics and behaviors of preferred embodiments of our present invention will next be introduced by way of analyzing two very general examples: tracking a generic (but noncooperative) moving object, and tracking a generic airborne object. Both these exercises are performed by an unmanned airborne vehicle ("UAV"):

1) UAV to Noncooperative-Moving-Object Example

Many practical problems present the task of pursuing or rendezvousing with vehicles or other objects that may be in motion. Among these, merely by way of illustration and without at all attempting to be exhaustive, are air-traffic control, fully automatic drive-by-wire multivehicle highway operations, astronautical docking, military encounters, and delivering airdrops of food or the like to a remote very small region (e.g. a "desert island").

Military agencies often face the task of acquiring and neutralizing noncooperative objects while the latter are mobile. In the most modern of current-day war environments, all the requirements are very extreme—the urgencies, the velocities and accelerations, the destructive forces, and especially the sophistication and ingenuity built into evasive efforts by the pursued (and presumably hostile) object. Nowadays, however, any attempt to engage and destroy a hostile object must reflect cognizance of surrounding civilian populations.

These are nearly diametrical requirements. In present times, virtually daily, public news media remind us that an ideal solution to this quandary is probably a low-yield payload that can be delivered with minimal miss distance to a relatively small moving object—such as an automobile or, sadly indeed, an individual human being.

A small unmanned vehicle of some sort, particularly a UAV, presumably provides an ideal delivery platform for such a payload. This task, unfortunately, has been impeded by poorly performing guidance systems or, alternatively, by expensive and heavy inertially stabilized sensors.

This invention solves the problem of measuring angular LOS rate needed to perform proportional guidance with near-zero miss distances but at minimal cost. As suggested above, our invention enables extraction of such estimates from a strapdown imaging sensor, and without the aid of an inertial-rate sensor.

Furthermore our invention enlarges the launch envelope if the complementary "range rate over range" measurement introduced in our previously mentioned patent application about terminal homing is incorporated into the system and method described here. Consolidating both these inventions into a single common technology optimizes the proportional-navigation-guidance loop gain.

2) Air-to-Air Mission Example

Conversely, unmanned surveillance and reconnaissance aircraft are no longer the essentially exclusive province of free-world nations or, in fact, of any established country. Such craft are now incipiently within the reach of terrorists and insurgents.

A particularly chilling threat, from enemy UAVs, is their potential for revealing positions and activities of covert missions launched by North American and European governments. "Covert" efforts naturally can become extremely dangerous, as well as diminished in value, to the extent that they are observed—i.e., no longer covert. Preservation of logistics secrecy calls for ability to seek and disable hostile UAVs, thus enhancing the ability to stay covert and improve operational timelines of a mission.

Barriers to such deployment of current imaging-seeker technologies on small UAVs are cost, size, weight, and power. Gyrostabilized gimbals that steer the imaging sensor, such as those in a Sidewinder missile, are typically used to generate the inertial LOS-rate information required by the guidance algorithms—and we have earlier pointed out the high costs involved in constantly supplying inertial data.

We illustrate a single-plane version of the intercept geometry, and provide basic mathematics for the LOS rate (FIG. 1). Traditional strapdown seekers (imagers, without inertial stabilization) heretofore have had serious limitations against moving objects or in windy conditions because they could not measure LOS rate directly. Algorithms designed to estimate effects of pursued-object speed and wind conditions can improve strapdown-seeker performance—but not if wind changes or pursued-object accelerations lead to overlarge miss distance, causing the mission to fail.

A New Guidance Law:

The present invention introduces a new guidance law. Recent research papers in the same area of study express a need for the seeking platform's body inertial angular body rate information, conventionally found from e.g. rate gyroscopes—but our invention does not use gyros. It instead applies background scene content to extract an equivalent of inertial angular body rate information.

Our processing algorithms utilize optical flow and image registration to develop LOS rate measurements for homing a moving object. This measurement is derived strictly from the imagery produced by a body-fixed imaging sensor (EO or IR); no inertial angular body rate sensor is required. This technique offers precision guidance and control capability without the cost, size, or weight associated with commonly used gimbals and inertial angular body rate sensors.

This document presents new image-processing techniques (i.e., LOS measurements from imagery) that generate true inertial LOS rates for pursued moving objects. Moving ground objects and moving airborne objects are addressed, separately, elsewhere in this document. As to moving airborne pursued objects, the present LOS innovation directly estimates the LOS angular rotation rate.

In the related provisional and regular patent applications mentioned earlier (relating to a terminal-accuracy guidance sensor), the combination of both LOS rate and the ratio of "range rate over range" from body-fixed imaging sensors is disclosed for stationary objects. That latter innovation is complementary to the present invention.

More specifically, for moving ground objects, both the new LOS technique disclosed here and the previously disclosed terminal-accuracy guidance algorithms—in combination—cooperate to develop the LOS-rate measurement. These techniques can be used for either terminal homing or object avoidance.

The techniques rely on inertially stable background scene content. They have demonstrated accurate measurements of moving-object LOS when flying toward the earth or away from the earth. Subject to limitations discussed later in this document, the algorithms are equally valid in both those situations, and in flying either toward or away from a building.

Guidance-Specific Features:

Preferred embodiments of this invention encompass:

1. use of optical-flow and image-registration techniques to derive an angular-rate estimate for the LOS vector connecting an object in the field of view of a sensor with the sensor itself;
2. application of the "range rate over range" measurement (disclosed in our previous application) to produce enhanced performance envelopes against moving objects;
3. use of LOS-rate processing, as described in this document, as a guidance aid to intercept objects of interest whose optical signature has been processed via our algorithms for the purpose of calculating an intercept command; and
4. use of the same LOS-rate processing as a guidance aid to avoid objects of interest whose optical signature has been processed via our algorithms, for the purpose of calculating an object-avoidance command.

Our LOS-rate approach solves the LOS equation without the size, weight, power, and cost of inertial angular body rate gyros. The LOS-rate measurement needed by the guidance algorithm is accurately determined, exclusively with programmed image-processing electronics—whether configured to operate as software, or fabrication-preprogrammed as in an application-specific integrated circuit ("ASIC"), or structured as in a field-programmable gate array ("FPGA"), or otherwise. Such processing is compatible with any progressive scan imager.

A small, lightweight scan mirror provides enhanced field of regard to the strapdown imager. If armed, an air vehicle can switch, on command, from general surveillance—with our enhanced-field-of-regard sensor—to attack mode.

The performance of an inertially stabilized guidance system is thus achieved with the smaller, lighter, and less-expensive sensor system. Unmanned enemy craft can be eliminated rapidly, enabling a corresponding covert mission to be accomplished on time.

LOS Angular Rate Estimation Using Image-Processing Algorithms:

Pursued Objects Moving on the Ground

Figure 2:
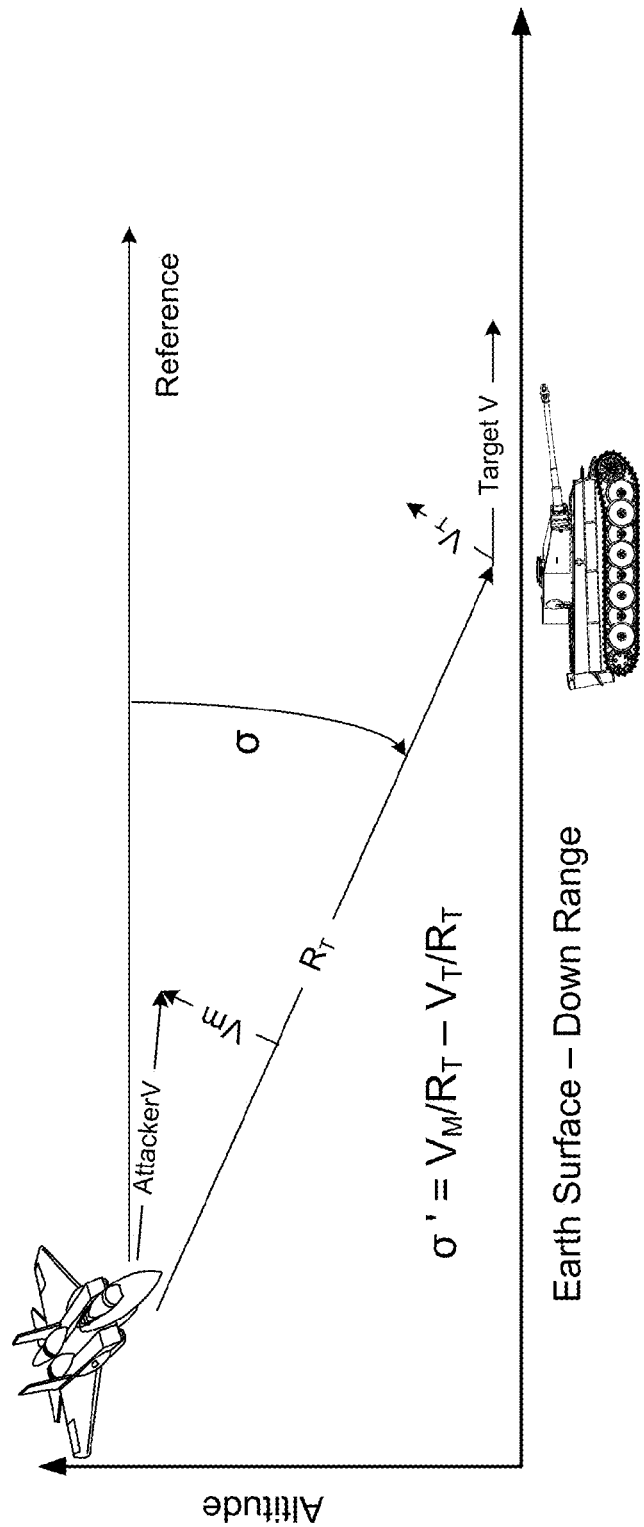
FIG. 2 is a like diagram but instead for air-to-ground interception.

We have set forth LOS-rate mathematics (FIG. 2) for a single-plane intercept of a pursued moving object that is on the ground. We define:

σ' as the LOS rate;

$V_M$ and VT as, respectively, the velocity of our pursuit aircraft and of the pursued object, perpendicular to the LOS; and $R_T$ as the range from our pursuit craft to the object.

Our previously mentioned '028 provisional patent application, and its resulting U.S. '638 patent application and corresponding issued U.S. Pat. No. 8,686,326, present the use of optical flow to determine $V_M/R_T$. Our new LOS algorithm, set forth in this present patent document for estimating angular rate—is designed to measure the other term $V_T/R_T$ in the equation.

If the two terms are measured independently, then superposition applies and the two terms may be added together to estimate the total LOS rate. By running both algorithms on the sensor imagery, this invention accurately determines the LOS rate—with, as stated earlier, no need for inertially stabilized sensors. The earth itself provides an inertial reference.

A fundamental characteristic of our present LOS methods is that pursued-object motion relative to immediately adjacent background imagery—as imaged by our onboard (e.g. strapdown) sensor—is a direct measurement of $V_T/R_T$. By using tracking, registration, and optical-flow algorithms, we can measure the speed (in pixels per second) of a pursued object relative to the background.

The number of pixels per second directly correlates with the number of radians per second, via the so-called "instantaneous field of view" (IFOV). This terminology arose in the context of earlier single-pixel scanning sensors that considered each pixel successively, one at a time; hence nowadays, in an array-sensor context, this terminology may be somewhat more accurately replaced by "per-pixel field of view" (PPFOV). Our LOS-rate estimation can be implemented in either of two ways:

(1) by registering the background scene in successive image frames, and measuring optical flow of the vehicle; or (2) by frame-to-frame registration of the vehicle, and application of optical flow to the immediately adjacent background imagery.

Our approach exploits the correspondence between certain pixels in the imagery and surroundings of a pursued object. When processed temporally, these pixels possess easily identifiable features. While tracking the object through conventional means, we can extract both the object and its surroundings from the image.

As the object moves over the ground, these surrounding features provide a reference to the inertial frame. By moving the extracted sequences into the rest frame of the object, we can estimate the contribution of the object to the LOS angular rate—through a registration process. Such registration is preferably performed by:

first evaluating the optical flow between consecutive frames, next providing a rough image registration (as explained below), then selecting anchor points for the image sequences, and finally applying a finer image-registration technique to provide the output image-registration solution.

This "registration solution" is simply the coordinate translation needed to align the inertial surroundings of the object. Multiplying this solution by the PPFOV (or "IFOV") of the sensor thus produces the negative value of the contribution of the pursued object to the angular LOS.

For astronautical docking and the like, a "background scene" is virtually always available—namely, the stars. The "range rate over rate" calculation, however, unfortunately cannot be implemented under such conditions.

To provide a rough registration, there are at least two workable techniques: operating an inexpensive, low-quality inertial rate sensor, or operating an optical-flow procedure. (In either case it is also necessary to do efficient embedded registration and mapping, and apply a resulting nomography matrix to imagery around the object.)

For purposes of this document, including the claims, an "inexpensive, low-quality inertial rate sensor" suited for rough registration costs typically under $500, versus more-expensive ones in the $2,000 to $20,000 range—used heretofore in systems that do not include optical-flow provisions of our invention. The less-expensive units use less-precise measurement techniques—such as those of MEMS gyros (from Analog Devices or ST Microelectronics). Typical such devices use silicon sensing to measure electrostatic resonances. The more-expensive gyros use either true mechanical structure to measure Coriolis effects, or fiber-optic units that measure small difference in light propagation over time.

Figure 3:
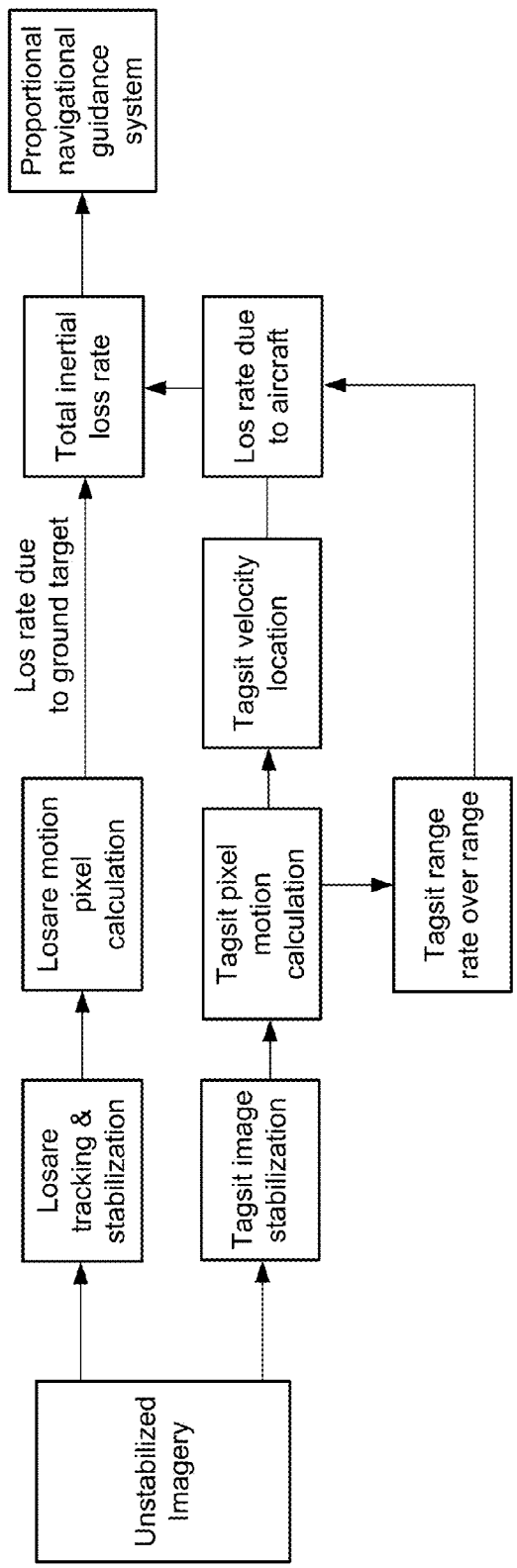
FIG. 3 is a flowchart of an algorithm for homing in on an object that is moving on the ground.
Figure 4:
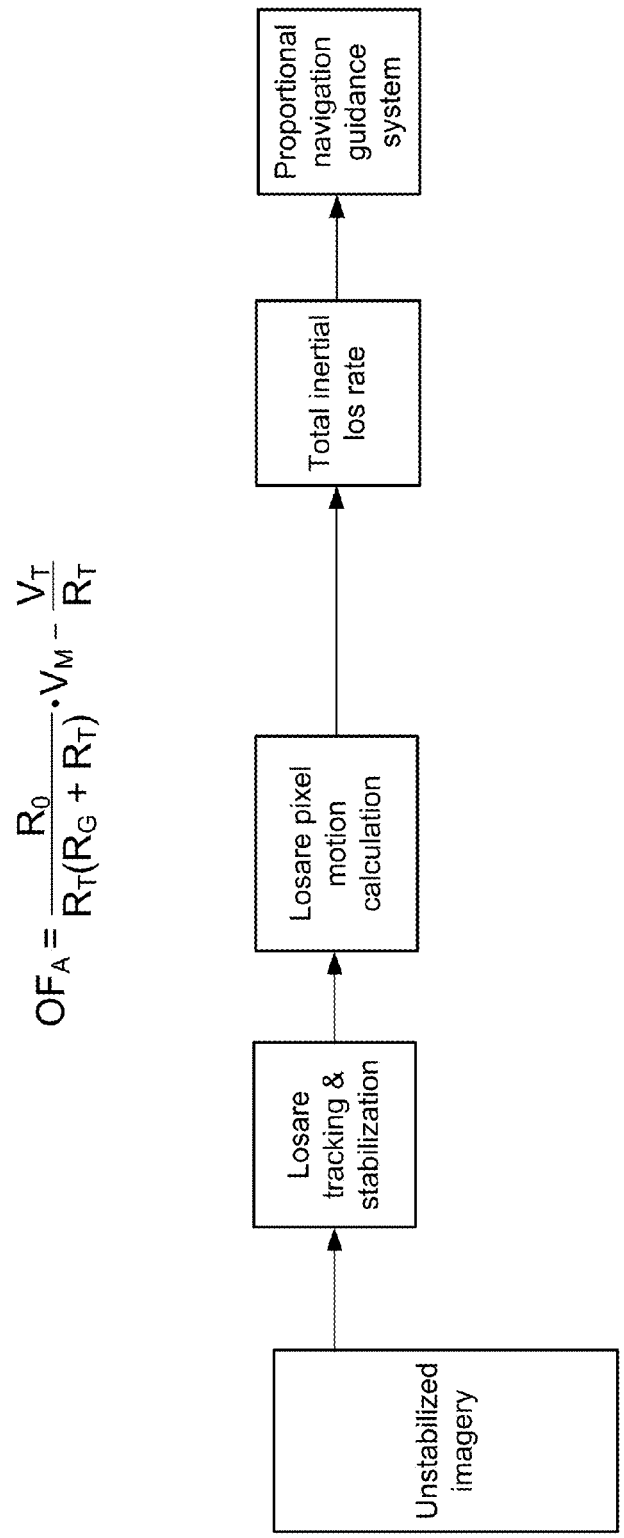
FIG. 4 is a like flowchart but for an object moving in the air—this figure also displaying an associated equation.
Figure 5:
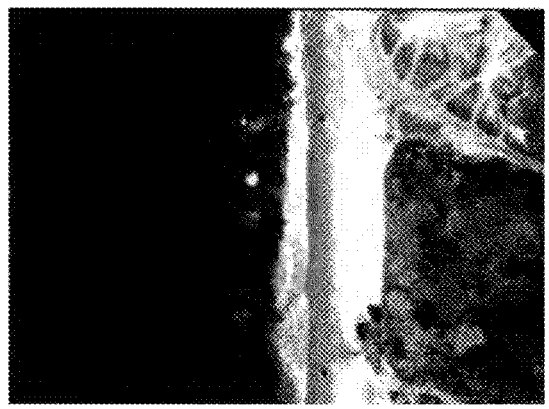
FIG. 5 is a simulated sensor image of an unmanned airborne vehicle (hereinafter "UAV"), for pursued-object distance of 1,500 meters.

The present LOS-rate invention, and image-processing algorithms from the "range rate over range" invention of our previously-mentioned patent application, cooperate (FIG. 3) to derive the same guidance information used by successful, existing, gyrostabilized imaging seeker missiles. Again, however, our approach operates at a small fraction of the cost, size and weight of those earlier devices.

Moving Air Targets

We define terms here exactly as set forth earlier for a simplified model (in a single geometrical plane) of an air-to-air intercept (FIG. 1). Our algorithms described in this document develop LOS rate by examining apparent movement of—in particular—the inertial backdrop or background scene of a pursued mobile object.

By evaluating the way in which such a backdrop appears to move when the pursued object is isolated, we produce an estimate of change in the inertial LOS. For airborne pursued objects, as the tracking vehicle closes in, the output of the algorithm approaches the true LOS rate. The output $OF_A$ of the LOS optical-flow algorithms equals:

$$OF_A = \frac{R_0}{R_T(R_0 + R_T)} \cdot V_M - \frac{V_T}{R_T}$$

We consider these two cases:

If $R_G \gg R_T$, then $OF_A$=true LOS Rate ($\sigma'$) between the pursued object and our tracking vehicle. This relation develops the solution for air-to-air missions that are of interest in representative programs. As our tracking (or attacking) UAV closes in on the pursued object, the ground range $R_G$ naturally becomes much greater than $R_T$. Thus, the LOS rate also naturally becomes precise during interception even for low-flying objects.

If $R_G \gg R_T$, then $OF_A$=LOS rate due to pursued-object motion only. This can be used in combination with the optical-flow development reported in the above-mentioned provisional patent application to complete guidance solutions for many applications.

The Algorithms of Our Invention

Our implementation architecture is straightforward. The imaging sensor passes imaging data to a tracker and to our Estimating Processor. The tracker reports the location of an object of interest within the sensor's sensing domain. The Processor then uses this information to isolate the object of interest and its surroundings.

The newly isolated object is then loaded into its rest frame—with its previous realization in the imaging sequence—through registration techniques. The two image realizations are then inertially registered via their surroundings.

Determination of the contribution by the pursued object, to the LOS rate, does not depend upon any particular registration implementation for the inertial registration. A suitable registration strategy can employ first a coarse registration scheme, such as optical flow or operation of an inexpensive, low-quality inertial sensor, followed by a refinement step such as a localized correlation routine. The registration corrections generated as the result of this move from the pursued-object frame to the inertial frame can then be used to calculate the contribution by the object to the LOS rate.

To calculate the LOS rate, one reverses the algebraic sign of the translation registration adjustments calculated by the high-quality inertial registration routine, and multiplies the resulting value by the PPFOV (IFOV) of the sensor, divided by the time differential between successive imagings of the object—i.e., in essence, the frame rate.

Image Registration Techniques:

Many image-registration processes appear in the literature: crosscorrelation, maximum entropy, mutual information, and Fourier-based techniques have all found their uses. For the UAV example a simple crosscorrelator was used, but any registration technique can be used to refine the coarse optical-flow registration. The particular choice of refinement registration does not affect this invention.

Simulations, & Performance Under Realistic Conditions

To demonstrate the effectiveness of our invention, we have created a realistic simulation of data collected under the UAV operating conditions of interest. We accomplished this by using ground-mapped imagery with a sequence of moving objects to represent what the UAV might see on a typical mission of imaging, surveillance and reconnoitering ("ISR"). The imagery was then mapped into the sensor frame of the UAV through standard four-vector projective geometry. Three scenarios were tested: the UAV stationary, laterally moving at constant elevation, and laterally descending.

To test the suitability of our algorithms, we ran the simulated UAV imagery through them and calculated the inertial LOS rate as ground truth. We also calculated the discrepancy ("error") between the two. For all three scenarios the simulated sensor was an electrooptical unit with focal length 35 mm, pixel pitch 12 pm, and CCD dimensions 640×480 elements.

In the stationary-UAV simulation, the altitude was set to 1,500 meters. The object moved along the ground (altitude zero meter); the object's contribution to the angular LOS rate was calculated both through our algorithms and through an inertially referenced calculation.

For the laterally moving UAV at constant elevation, the UAV was provided a velocity of −30 m/s in a northwest direction, again at 1,500 meters above ground level.

For the laterally descending case, a velocity of −50 m/s was assigned in the northwest-down direction. The initial altitude for the descending case was 1,500 meters above ground level. The simulations that allowed for UAV velocities provided a special challenge in that the object moved through the scene, and in the latter case (descending) was concurrently moving and dilating in successive frames. To track the vehicle we used a simple crosscorrelation based tracker.

Figure 6:
FIG. 6 is a group of four stacked frames from the FIG. 5 scene, accumulated as the object image moved across the receiving CCD.
Figure 7:
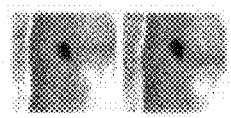
FIG. 7 is a pair of like object images extracted from optical flow and registration refinement.

Images were generated for a simulation mode (FIG. 6), and from these the pursued object and its surroundings were extracted—producing modified images (FIG. 7). Optical-flow and image-registration algorithms were run to derive the contribution by the pursued object, to the inertial LOS rate. To characterize performance we compared the ground-truth inertial calculations of the pursued-object contribution to the LOS rate with the prediction from our LOS algorithms.

In all three scenarios our algorithms performed well, with errors on the order of those from a single-camera PPFOV (IFOV).

The devices and methods disclosed can be used for either terminal homing or object avoidance. These devices and methods rely on inertially stable background scene content. The imaging seeker looks along the LOS vector R (FIG. 8), and tracks the motion of the pursued object relative to the background contrast.

This approach does have limitations that are not present in the more-expensive, bulky and heavy gyrostabilized seekers:
  if the background contrast scene has a significant amount of movement, then it does not provide adequate inertial reference (for example, if the background scene is clouds moving at high speeds, then the resultant LOS rate calculation is biased); and
  the system also does not ordinarily perform well with a so-called "coaltitude" (or "co-altitude") intercept—i.e., in viewing a pursued object that is at roughly the same altitude as the imaging module—because the atmosphere does not provide sufficient imaging contrast. (If, however, there were a background scene that provided contrast, such as a relatively large wall or mountain, then a coaltitude intercept would be feasible.)

Simulations of this technique have demonstrated accurate measurements of moving-object LOS when flying toward or away from the earth. The algorithms are equally valid flying toward or away from a building. In flying away from an image (e.g. a background image), however, for adequate contrast it is preferable to employ an extension of this invention: two cameras are used—one mounted looking forward, i.e. toward the pursued object, and the other looking aft toward the receding background. The two cameras are calibrated to be precisely aligned. The camera looking aft sees the image radially contracting, providing information for the optical-flow processor. The camera looking forward tracks the pursued object.

The object-tracking software determines which pixel best represents the centroid (or "center") of the object. This pixel establishes an angle from the camera centerline—an angle that can be extended through the munition to the aft-looking camera, where it has a virtual intersection with the focal-plane array of pixels, in that aft camera. Our algorithms can then be applied to the imagery of the aft camera just as if the pursued object were actually present in its imagery.

Included in this document—just following this paragraph—is a brief discussion of our previously mentioned alternative method for "rough registration", with low-quality inertial sensors. Following that discussion, the next major section of this document is a substantial copy of the "Detailed Description" section of the terminal-guidance patent application—covering, inter alia, "range rate over range" derivation. After the Detailed Description copy, we include extensive recent notes on refined mathematics relating to that same terminal-guidance invention. Following those notes we also summarize concepts associated with that invention. As noted above, several teachings of the terminal-guidance application are beneficially combined with those of the present application—e.g., to optimize proportional-navigation guidance loop gain.

Figure 9:
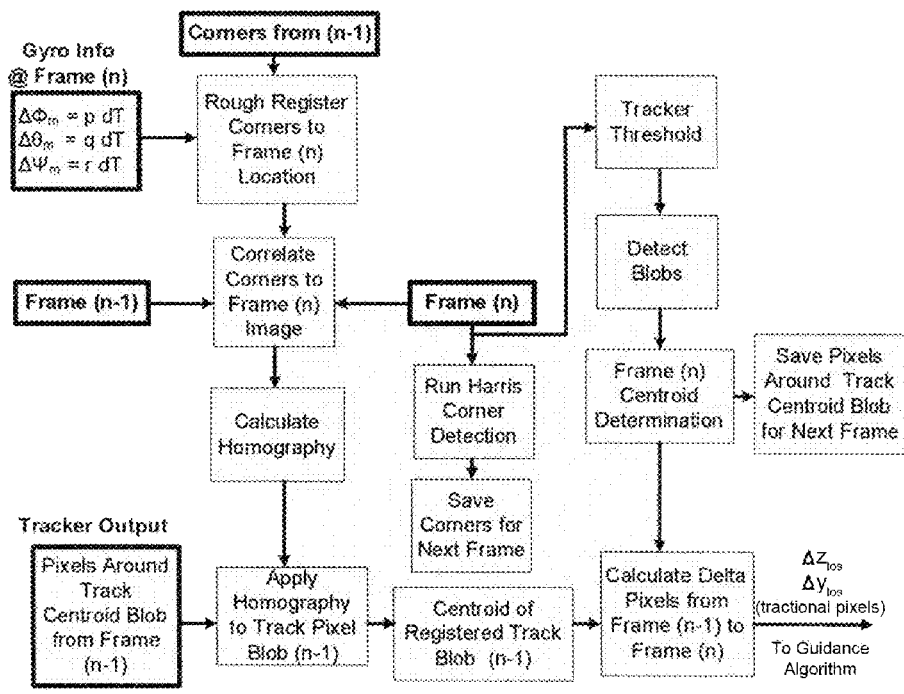
FIG. 9 is a single flow chart particularly showing a registration and mapping approach to LOS angular-rate estimation—an approach that employs an inexpensive, low-quality inertial-rate sensor, substituted for optical flow, to prepare a first, rough but efficient embedded image registration and mapping.

Excerpt from Mathematical Notes on Using Low-Quality Inertial Sensors to Provide a Rough Registration Method 2—Target Centroid Distance within Two Registered Image Frames This method applies registration technology across the entire field of view to create the inertial reference. The target moving relative to this registered reference information can be measured by the video tracker. FIG. 9 shows a block diagram of this approach. Critical to the success of implementing this approach with a minimal embedded circuit footprint is the use of the MEMS gyro information to get a rough registration. This reduces the search space for the correlation of the Frame (n) and Frame (n−1) images. This is the preferred method from an algorithm robustness and accuracy risk viewpoint. If the hardware design is sufficiently small in size, weight, and power, then this approach should be used.

Figure 10:
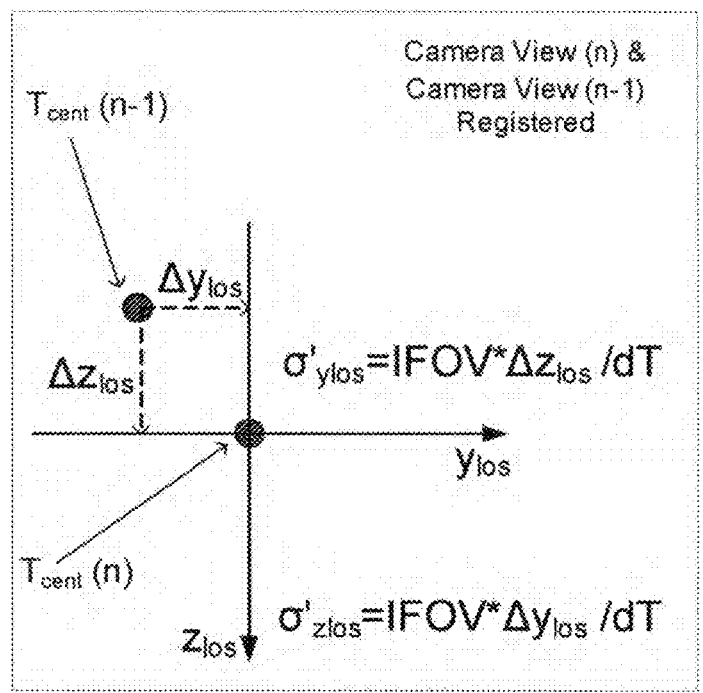
FIG. 10 is analogously a single diagram, particularly showing how we calculate LOS rate components for the rough registration of FIG. 9.

The conversion of the LOSARE output into components of LOS rate is shown in FIG. 10. Note that a linear measurement in fractional pixels converts to an angular measurement about its orthogonal axis. Fractional pixels are converted to angles by multiplying the Instantaneous Field of View (IFOV), which is measured in radians. The time dT between image frames is measured in seconds. The LOS Rate σ' is sent to the Guidance algorithms in units of radians/sec.

Copy of Detailed Description from the Terminal-Guidance Patent Application

Preferred embodiments of our invention apply optical-flow image processing for certain terminal-phase guidance-and-control refinements. In these optical-flow strategies, images from a body-fixed camera unit (i.e., a camera fixed directly or indirectly to the vehicle) are analyzed and the results used to precisely determine certain critical angles that enable the desired refinements as detailed below.

In two such optical-flow strategies, which replace the two primary navigation-based methods detailed in the "BACKGROUND" section above, the velocity vector can be aligned relative to the platform (i.e. vehicle) centerline—or to a destination vector, respectively. These strategies thus substantially eliminate the several difficulties outlined in the "BACKGROUND" section above, in particular solving the bunker-busting and destination-precision problems mentioned earlier, and doing so without help from a gyrostabilized imaging seeker or other navigation apparatus.

Using a priori knowledge of the target location in a stored image file, a strapdown imaging sensor can determine the angle between a velocity vector and a desired aimpoint in the image. In a "bunker busting" application the result can be a deeply penetrating crater (as described earlier), rather than only a superficial shattering, in an opponent facility. In a guidance application the result can be geographically very precise delivery for virtually any kind of craft. In the military world these concepts apply to Cruise missiles, and to "JDAMs" ("Joint Direct Attack Munitions"), which are used by several military organizations and, indeed, to many different kinds of unmanned airborne vehicle ("UAV").

Such benefits are readily extended into other platform applications, including autonomous or aided landing of non-destructive air vehicles—as well as indirect homing, such as the parachute drops and other delivery situations enumerated above. Optical flow provides both a direct measurement of aircraft sideslip angle (so-called "crab angle") and a predicted touchdown point or destination in the landing zone. All such measurements are useful for robust autopilot and guidance performance.

Ground vehicles, as well as airborne craft, can advantageously utilize our invention. The same concepts set forth above with regard to munitions also aid autonomous unmanned ground-vehicle terminal guidance (e.g. for entrances to caves or in approaching windows or doorways).

Nearly all such usages can be improved through optical-flow algorithms, particularly those according to our invention. These applications can apply optical flow to determine an inertial navigation solution (three position states, three attitude states, and three velocity states), when GPS updates are not available.

As noted earlier, our invention is different from prior art in that it does not rely on a navigation solution. Instead it directly measures angles between:

(1) a velocity vector and the airframe centerline, for control correction, and (2) a velocity vector and a scene-based destination point—essentially on the ground—for guidance correction.

Our invention further differs from prior strategies such as "structure through flow"—also mentioned earlier. Our invention differs from that prior work in that we use optical flow to steer a vehicle to a desired destination point on a hillside, building, or other standing object. Information derived from optical-flow algorithms replaces the measurements used in gyrostabilized imaging seekers and the like.

A preliminary objective of our image-based homing and control invention is to accurately measure the angle between a velocity vector of a vehicle and the other two above-stated reference directions. To accomplish such objectives, a camera is fixed to the vehicle, most typically to its nose, and is accurately aligned to the body (again, ideally to the centerline).

Doing this ensures that the center of the imagery corresponds to the pointing direction of the vehicle. Using only this simple imaging unit together with modest analytical programming, our invention is able to accurately determine any offset angle between the velocity and "look" vectors of the vehicle. (By "look" vector we mean the direction in which the vehicle and thus the camera are pointing.)

Preferred embodiments of our invention exploit the fact that a pixel, in the imagery, that corresponds to the velocity vector exhibits unique and easily identifiable features when processed temporally. More specifically, as the craft flies toward the ground, the overall image expands away from a center of expansion.

The latter point is sometimes called—somewhat less precisely—the "centroid" of expansion. The center of expansion is the target point of the look vector, which is also the aim point of the velocity vector.

Figure 11:
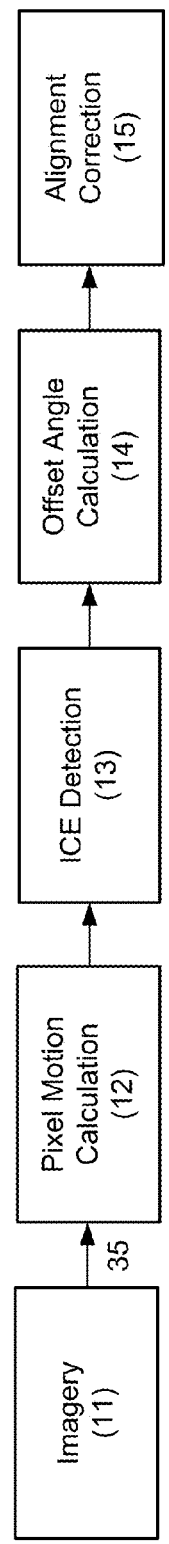
FIG. 11 is an image-processing algorithm flowchart.

Once our invention has detected the location of this center of expansion in the imagery, the system can easily go on to calculate the necessary offset angles for input to an alignment-correction subsystem. The overall technique involves three relatively simple steps described in greater detail below: pixel motion calculation 12 (FIG. 11), image center-of-expansion (ICE) detection 13, and offset angle calculation 14.

Pixel Motion Calculation

From one frame to the next, each pixel in the image moves away from the aim point of the craft. (It is commonly said that "each pixel expands away" from the aim point; however, it will be appreciated that, to be more precise semantically, it is the overall image, not in general an individual pixel, that "expands away". Even though a pixel does have a certain small area extent and therefore is capable of expansion, the crux of the matter seems better articulated in terms of expansion-away of the image.)

We can effectively quantify this by using an optical-flow algorithm to find how the content of each pixel moves between frames (pixels per se do not move). The basic idea of optical flow is to estimate the motion of the content of each pixel in an image sequence. The algorithm inputs two images 11, separated in time, and outputs two arrays 15 corresponding to the motion along the x and y axes (in units of pixels per update).

Most, if not all, optical-flow algorithms are based on the constraint that the brightness of each object in the scene is constant in time, regardless of its motion. This assumes that there are no lighting changes across an image (e.g. moving shadows) and that an object will not change its intrinsic brightness.

For the types of motion usually considered, sudden lighting changes are not likely to be a significant issue. Further, the brightness of the types of objects typically seen by a UAV camera (e.g. landscapes, buildings, trees, cars) generally does not change over short time scales.

The constant-brightness constraint is expressed as:

$$\frac{dE}{dt} = 0$$

where E is the brightness (or "pixel value") of a particular object in the image. Applying the chain rule for differentiation yields:

$$\frac{\partial E}{\partial x}\frac{dx}{dt} + \frac{\partial E}{\partial y}\frac{dy}{dt} + \frac{\partial E}{\partial t} = 0$$

Upon substituting $v_x$ and $v_y$ for the velocities in x and y, respectively, and rewriting that equation in vector notation:

$$\left(\frac{\partial E}{\partial x}, \frac{dx}{dt}\right) \cdot (v_x, v_y) = -\frac{\partial E}{\partial t}$$

The brightness partial derivatives can be calculated from the imagery and the velocities; and $v_x$, and $v_y$ are the unknowns for which we wish to solve—but there are two unknowns and only the one equation above. As can be appreciated from study of the equation, this is the component of motion along the direction of the brightness gradient.

Calculation of another component of motion, ideally an orthogonal component, requires an additional constraint. The main difference between various optical-flow algorithms is the particular second constraint used.

Our invention is independent of the second constraint used, in the sense that the present invention can produce valid guidance and control results regardless of the "second" constraint that is adopted. This condition is true, provided only that the constraint reflects with reasonable accuracy the physical realities of the vehicle operations that will eventually be guided or controlled.

One such algorithmic constraint that we have found satisfactory was first proposed by Horn & Schunck in "Determining Optical Flow," 17 Artificial Intelligence 185-203 (1981). Their algorithm introduces a smoothness constraint, namely an assumption that neighboring points in an image have similar velocities. The algorithm accomplishes this by minimizing the square of the magnitude of the gradient of the optical flow velocity:

$$\left(\frac{\partial v_x}{\partial x}\right)^2 + \left(\frac{\partial v_x}{\partial y}\right)^2 \text{ and } \left(\frac{\partial v_y}{\partial x}\right)^2 + \left(\frac{\partial v_y}{\partial y}\right)^2$$

These constraints can be used to derive the iterative expression:

$$v_x^{n+1} = \overline{v}_x^n = \frac{\partial E}{\partial x}\Delta v$$

$$v_y^{n+1} = \overline{v}_y^n = \frac{\partial E}{\partial y}\Delta v$$

$$\Delta v \equiv \frac{\left(\frac{\partial E}{\partial x}\overline{v}_x^n + \frac{\partial E}{\partial y}\overline{v}_y^n + \frac{\partial E}{\partial t}\right)}{\alpha^2 + \left(\frac{\partial E}{\partial x}\right)^2 + \left(\frac{\partial E}{\partial y}\right)^2}$$

The overbars denote local averages of the velocity fields, and the alpha-squared term is a constant that weights the relative importance of each constraint.

Detection of the Image Center of Expansion (ICE)

We then use the motion vector at each pixel to calculate magnitude of the motion, representing the net shift for the content of each pixel between updates. Points farthest from the ICE move fastest; and points closest to the ICE, slowest.

The location of minimum optical-flow magnitude corresponds to the location of the ICE. This position is very easily identified.

$$v(x,y) = \sqrt{v_x(x,y)^2 + v_y(x,y)^2}$$

$(x_{ICE}, y_{ICE})$=position where v=min (v)

Offset Angle Calculation

The last step relates the pixel location of the ICE to offset angles that can be input to the alignment-correction subsystem of the vehicle. The relationship between ICE location and angular offset is expressed as:

$$\theta_{is} = \sqrt{x_{ICE}^2 + y_{ICE}^2} \cdot IFOV$$

The so-called "instantaneous field of view" ("IFOV") is the angular resolution of a single pixel. This terminology arose in the context of earlier scanning sensors that considered each pixel successively, one at a time—and hence nowadays in an array-sensor context is more accurately replaced by "per-pixel field of view" ("PPFOV").

For a narrow field of view ("FOV"), the PPFOV can be approximated as the FOV divided by the number of pixels. This is the angular correction that must be applied to a vehicle. The relationship between ICE and azimuth is expressed as:

$$Az = \arctan\left(\frac{y_{ICE}}{x_{ICE}}\right).$$

Since the azimuth represents the direction of an undesired offset, the correction is applied opposite to the azimuth direction.

Figure 12:
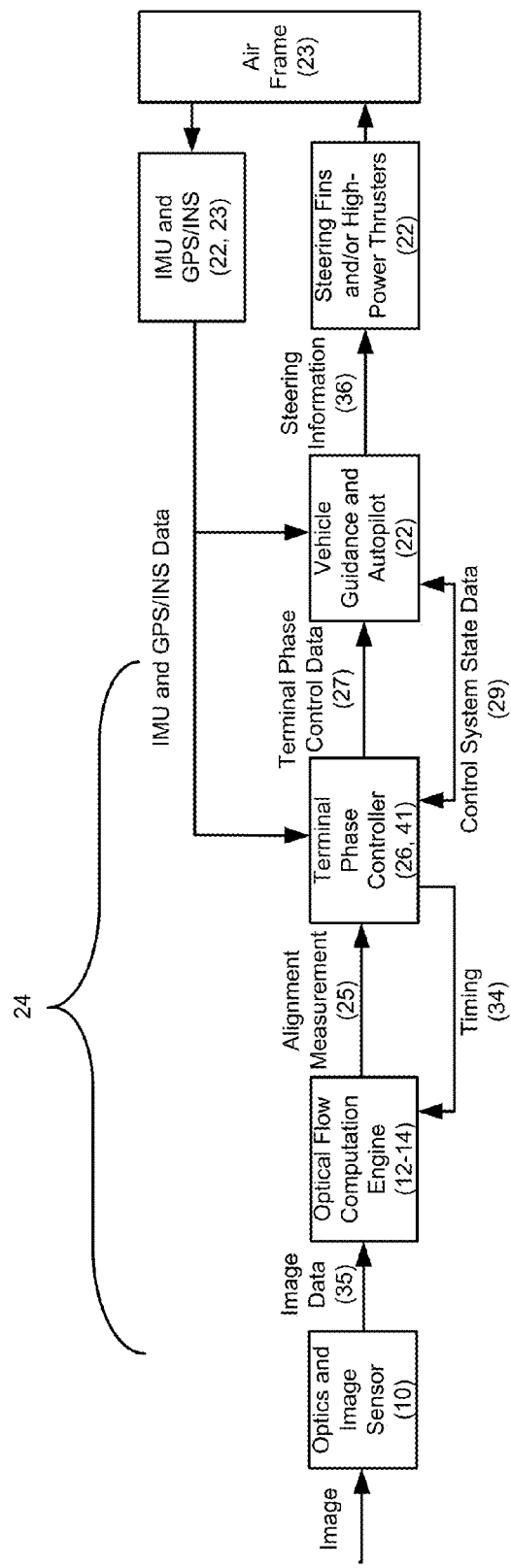
FIG. 12 is a simplified block diagram of a control system.

Electrical & Software Architecture:

The system that we now most highly prefer for our invention includes existing control structure 22 (FIG. 12) and physical elements 23 of a vehicle (e.g. munition), as well as components 24 that we add to provide sensory data 25 and manipulation of the terminal or impact phase 26 of the vehicle mission—and an airframe interface between the existing and new features, 22-23 and 24-26 respectively.

Digital imagery is presented to the optical-flow computation engine 12-14, which as mentioned above executes the pixel-content motion calculation, ICE detection, and offset-angle calculation. The terminal-phase controller 26 processes the resulting optical-flow alignment measurements 25 with the inertial measurement and GPS/INS unit 23 of the vehicle and their data 25, to generate commands 27 for the autopilot 28 of the vehicle during the final phase of flight or other travel. Vehicle-state data 29 are shared with the terminal-phase controller 26 and the guidance unit 22 to allow synchronization of the final few seconds of travel.

Figure 13:
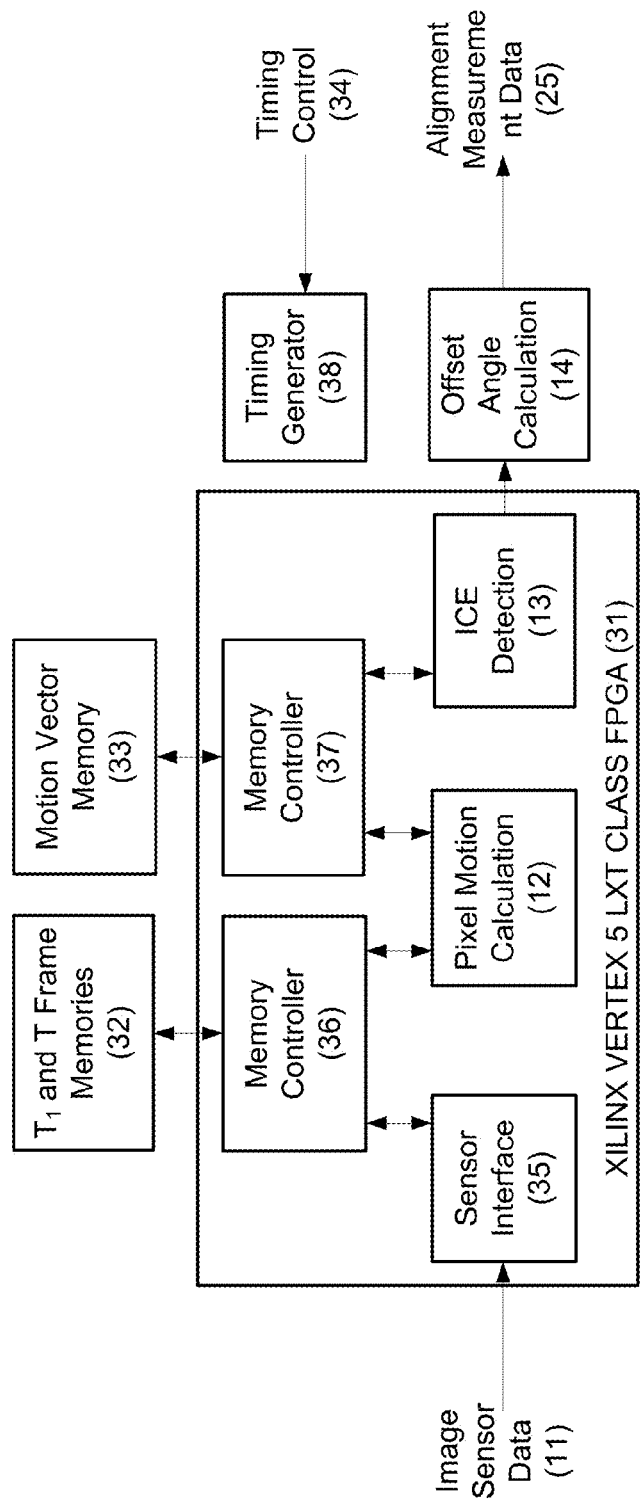
FIG. 13 is a diagram of an optical-flow computation engine.

To perform the three stages of optical-flow computation, real-time processing hardware (typically an FPGA-based module) is required. For example a Xilinx™ Vertex™ 5 LXT class FPGA 31 (FIG. 13) coupled with video-rate memories 31, 32 and their respective controllers 36, 37 is suitable for these steps. Processing is best done by pipelining 35-36-32-12-37-33-13-14 information through the system, performing the computations in parallel as the data become available—rather than bit-by-bit as in a typical software-oriented implementation.

Figure 14:
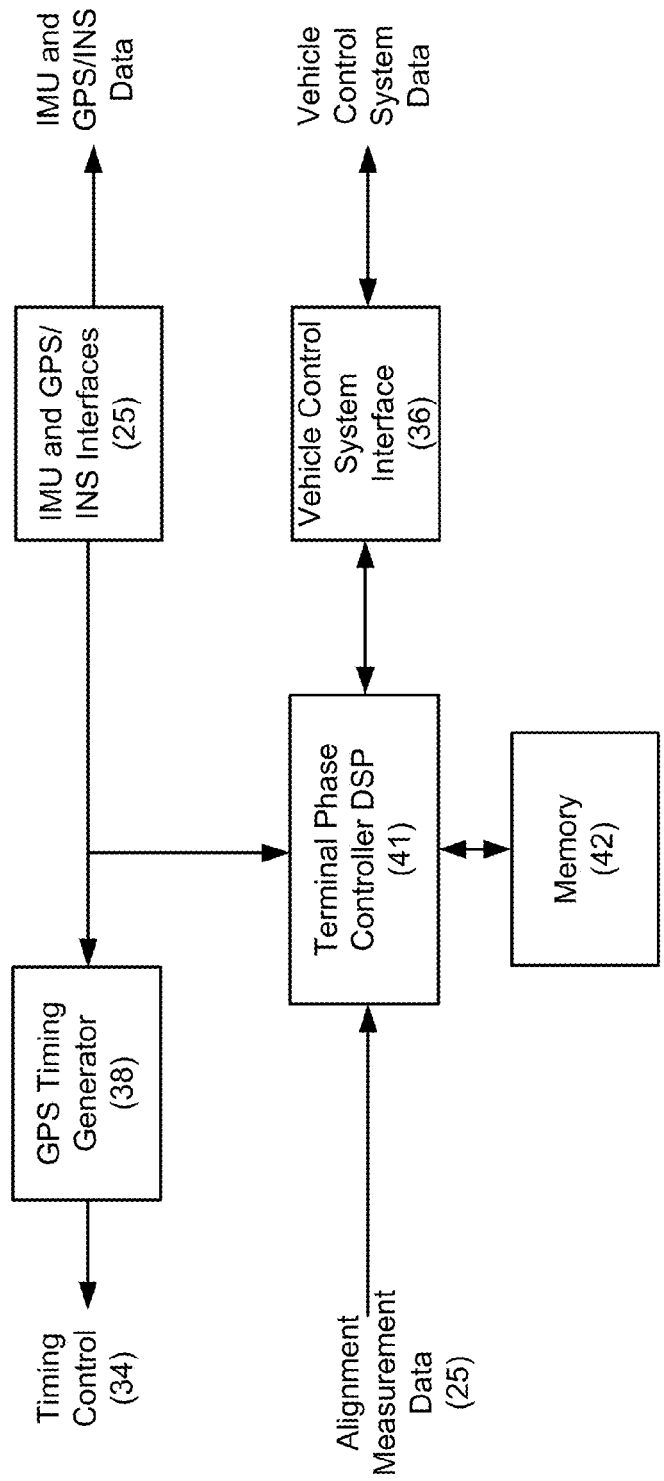
FIG. 14 is a like diagram of a terminal-phase controller.

In preferred embodiments of our invention, the terminal-phase (or, for a weapon, "impact-phase") controller most-typically calls for a conventional processing environment such as a high-speed processor 41 (FIG. 14), for example a digital signal processor ("DSP").

Optical Flow Performance Under Realistic Operating Conditions

To demonstrate the effectiveness of our optical-flow technique, we have created a realistic simulation of data collected under operating conditions of interest We accomplished this using high-resolution IKONOS satellite imagery to represent what a vehicle might "see" immediately prior to impact. To emulate views from higher altitudes, we spatially down-sampled the data, creating larger cell sizes that would appear from higher elevations. Lastly, to model the offset angle between the aim point of the vehicle and the velocity vector, we shifted each frame by a given number of pixels, consistent with the pixel-angle relationship.

To help evaluate our optical-flow solution to this problem, we selected an example set of imaging characteristics. We simulated a 512×512 pixel sensor with a 10' FOV and a 20 Hz frame rate. The sensor was "traveling" 3,000 feet/second toward the ground, beginning at 15,000 feet (FIG. 15) and continuing down to 500 feet. The simulated velocity vector of the camera was offset from the aim point by approximately one degree.

Figures 15, 16:
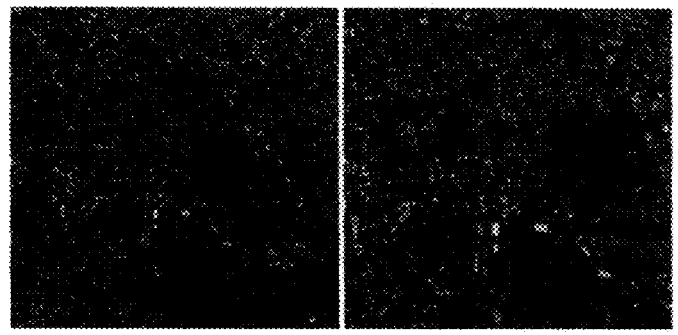
FIGS. 15 and 16 are a pair of satellite photographic images of a terrestrial area, used in a simulation of a preferred embodiment of our invention, and a simulated view from elevations of (in FIG. 15) 15,000 feet and (FIG. 16) 10,000 feet.

Accompanying are an image of an urban environment as seen through the imaging unit at 15,000 feet (FIG. 15), and another less than two seconds later at 10,000 feet (FIG. 16). As the vehicle flies toward the ground, the resolution improves and the image expands. At 10,000 feet we observe 30% finer ground resolution.

The offset of the image center of expansion (ICE) from the center of the optical axis can be easily seen by taking a temporal average of the data. The temporal average clearly shows the smearing (FIG. 17) of each pixel away from the ICE. The ICE can be visually spotted to within a few pixels; however, we want a signal that a detector can easily identify and distinguish from background clutter.

Therefore we calculated the optical-flow field during each time interval (using the Horn & Schunck algorithm described above). We then calculated the magnitude of the flow field between during each interval.

Since the imagery expands away from the ICE, the optical flow will be smallest exactly at the ICE. In our simulation, each flow magnitude had its minimum velocity within a few pixels of the simulated ICE; each such magnitude by itself would yield highly accurate correction calculations.

Figure 18:
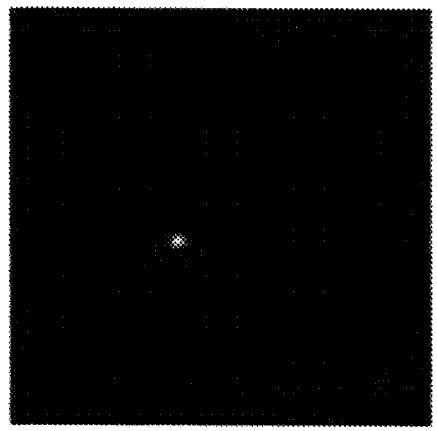

To obtain even better ICE estimates that improve over time, we performed a temporal average (FIG. 18) of the flow magnitudes. Any random noise appearing in the optical flow washed out, while the signal was reinforced. The minimum of the time-averaged flow field was within one pixel of the simulated ICE, yielding angular accuracy of approximately 0.02°.

Guidance Towards a Stationary Destination

We have earlier mentioned situations in which navigation is not available or not suitable to use as a basis for optical-flow guidance or control. Again, in these examples a GPS-guided vehicle may have a bias in its navigation solution, or GPS is denied or degraded, or operators have an image of the desired destination without having any GPS coordinates; or it may suddenly become necessary to suddenly make emergency deliveries of people or supplies to a location seen from the air. These circumstances can be resolved using visual data downloaded into the device—whether created moments earlier, or created from long-existing assets or databases.

As also noted previously, starting from a priori knowledge of a destination in a stored image file, a strapdown imaging sensor can find the angle between the vehicle velocity vector and a vector (called the line of sight, "LOS") from the vehicle to a desired stationary destination in the image.

Additional outputs of our optical-flow invention are used in conjunction with this angle to develop the inertial LOS-rate vector. Specifically, the LOS-rate vector is the angular velocity of that LOS between the vehicle and the destination. Many guidance algorithms are available for applying this LOS-rate measurement to reduce the total miss distance.

Such algorithms are not limited to following the LOS vector (or a vector based on the LOS rate) directly to the destination an approach most typically used only for an impact at termination. Rather, many commonly known guidance processes include autopilots for bringing vehicles (including aircraft) along a staged and often indirect approach to a gentle and relatively slow termination.

It will also be appreciated that available algorithms are not limited to effectuating an approach to a destination. To the contrary, many known guidance programs are well-suited for avoidance of particular destinations or objects—again, whether by direct route and impact or by indirect approach, rendezvous etc.

Imaging seekers offer the ability to deliver to precisely defined locations, but historically have required expensive, large, gyrostabilized, gimbal mechanisms. This invention duplicates the performance of the gyrostabilized seeker, but is implemented with any standard, low-cost, strapdown imaging sensor. This innovative approach to strapdown-sensor use allows for the advantages of proportional navigation; it can drive miss distance to near zero, without GPS updates, even in the presence of strong crosswinds.

Figure 17:
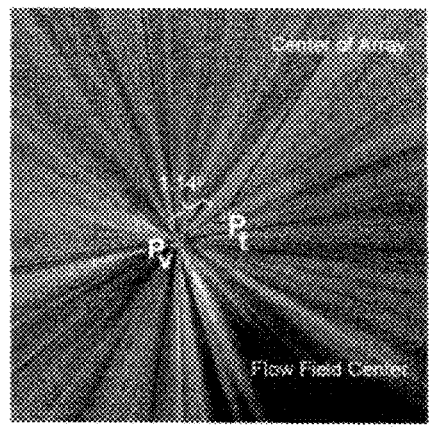
FIGS. 17 and 18 a corresponding pair of images demonstrating optical-flow processing, more specifically accumulated flow exhibiting the relationship between center of a camera array and the flow-field center; and an average of optical-flow imaging exhibiting the flow-field center isolated.
Figure 19:
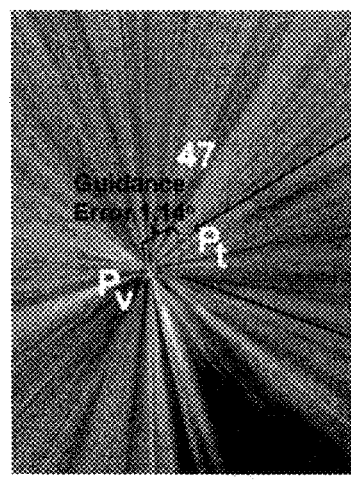
FIGS. 19 and 20 are another pair of images showing, respectively, velocity-vector projected destination determined from optical flow and from correlation to a specified onboard reference image.
Figure 20:
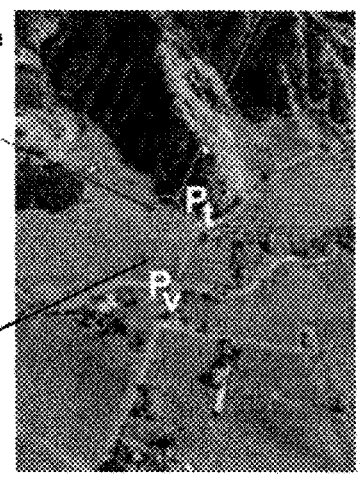
Figure 21:
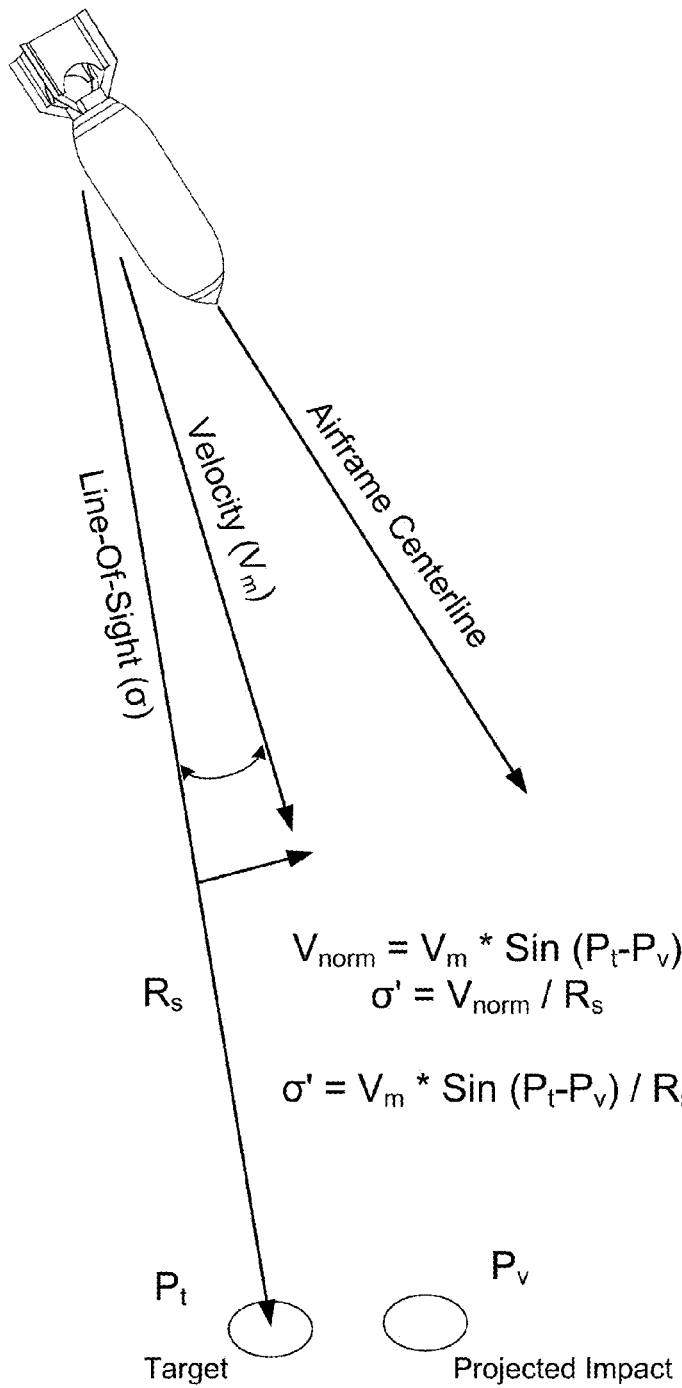
FIG. 21 is a diagram of LOS relationships, shown together with corresponding mathematics.

Optical-flow image processing accurately locates the velocity vector or "flow-field center" in the sensor field of view (FIG. 17, left side). The velocity-vector information is next correlated with the strapdown-sensor live image to determine a predicted destination point $P_v$ (FIGS. 17, 19, 20). A target tracker then finds the aim point in the image.

The target tracker, or image-based tracking method, can be chosen from many known such methods and devices. Therefore for any given application naturally a tracking approach can and should be chosen that is best suited for that particular application. The tracker provides the desired destination or "target" location, $P_t$ (FIGS. 17, 19, 20), in the exact same earth-image frame as $P_v$. Thus a guidance error signal 47 (FIGS. 19, 20) is generated. The number of pixels between $P_t$ and $P_v$ is a measure of an angular correction needed to guide the vehicle to the desired destination.

As this approach yields a direct measurement of the angle $(P_t-P_v)$, it is possible to close the guidance loop directly on that error signal. In essence this is steering the velocity vector to be directly on top of the destination point, an arrangement highly suitable for stationary destinations.

In order to avoid the same problems that pursuit navigation has in the presence of crosswinds, the loop controller is best augmented with an integrator. The angle $(P_t-P_v)$ can also be used in the mathematical construction of LOS rate σ', the signal more commonly used by terminal homing systems.

Figure 8:
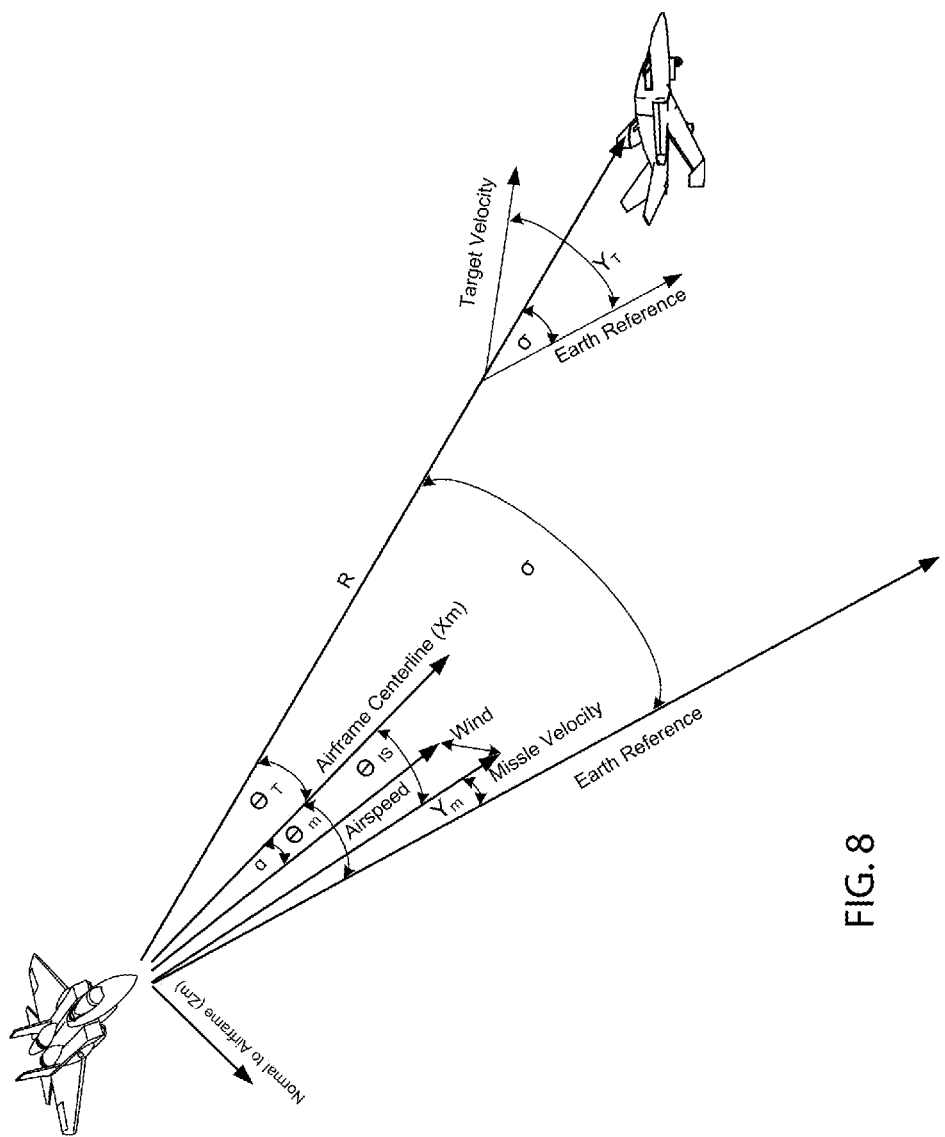
FIG. 8 is a summary diagram, particularly for certain extensions and limitations discussed in the related text.

Our algorithms construct LOS rate from measured values. FIG. 8 includes the single-plane equation used to construct σ' from measurements. The angle $(P_t-P_v)$ is found by optical flow and target tracking as previously described. The LOS rate is completed by deriving $V_m/R_s$, from other byproducts of the optical-flow calculation.

Highly successful passive imaging missile systems, such as the military "AIM-9X" and "Hellfire", have robust operational envelopes because they use some variant of proportional navigation. A critical factor in terminal homing systems implementing proportional navigation is the measurement of σ'.

Such known gyrostabilized seekers use their gimbals to closely track their destinations, providing direct electromechanical measurement of LOS rate σ' from the gyroscopic mechanisms. Our invention instead measures σ' strictly through passive imagery from a strapdown camera.

An intercept course can be developed by giving acceleration commands that drive a vehicle to target LOS rate to zero. When it is zero, the vehicle is on a collision course with the destination. The "Proportional Navigation" acceleration command $A_{cmd}$, is developed from the base equation:

$$A_{cmd}=NV_c\sigma'$$

where N is the navigation ratio, $V_c$ the closing speed, and σ' the measured LOS rate.

Optical-flow output at any given pixel is noisy. Areas of very low contrast can give false zero-velocity readings; however, there is a strong and linear trend for the magnitudes to be larger for pixels farther from the $P_v$ location. Below we display the basic mathematics of the optical-flow calculation.

$$\frac{x}{t} \frac{(xx_{ICE})}{z} \frac{z}{t}$$
$$\frac{y}{t} \frac{(yy_{ICE})}{z} \frac{z}{t}$$

(x,y)=pixel coordinates
$(x_{ICE}, y_{ICE})$=ICE location in pixel coordinates
The variables x and y are pixel locations defined in the focal-plane array, and z is distance above the ground. The output at each pixel is "range rate divided by range" multiplied by angular distance from the image center of expansion (ICE).

Calculating an average optical-flow output for each column of values across the focal-plane array generates a high-signal-to-noise-ratio estimate of range rate divided by range. The average value of each column equals the output described in the mathematical expressions above.

Upon replacing z with $R_s$, and the partial derivative of z with respect to t with "range rate", we can see that:

$$\left(\begin{array}{c}\text{average optical-}\\\text{flow output of a column}\end{array}\right)=\left(\frac{\text{range rate}}{R_s}\right)\cdot\left(\begin{array}{c}\text{horizontal angle}\\\text{from the ICE}\end{array}\right)$$

Range rate=$V_m\cdot\cos(P_t-P_v)$; and
the slope of the optical flow is $$S_{of}=V_m\cdot\cos\frac{P_t-P_v}{R_s}$$

Such expressions provide a derivation of all terms needed for the guidance-law algorithms of "Proportional Navigation" (FIG. 8) and thus enable refinement of vehicle-guidance precision.

Extended Copy of Mathematical Notes on Terminal Guidance

1 Purpose

The TAGSIT (Terminal Accuracy Guidance Seeker Imaging Technology) program will provide a lethal attack capability in a small UAS, enabling an organic capability for covert US forces to eliminate the threat of enemy UAS. Specifically, TAGSIT will develop a robust air-to-air terminal guidance capability within very limited size and weight constraints common in small UAS. The TAGSIT program will demonstrate a technique that produces proportional navigation through image processing, thereby eliminating the need for gimbals and tactical grade inertial rate sensors. Compared to other guidance algorithms that use Strapdown seekers and MEMS quality rate sensors, this innovative method of terminal guidance will deliver superior intercept performance in the presence of wind disturbances and target avoidance maneuvers.

This document describes industry common coordinate systems and variable names use to mathematically describe the flight of a missile (which is defined to be synonymous with a lethal UAS during attack mode). This provides a common vocabulary for discussing the technology and lays the groundwork for a simulation of the flight dynamics. Leaving the mathematics of optical flow computations to other sources, this document also describes how optical flow outputs and other mathematical methods are used to develop the Proportional Navigation Acceleration Command from the sequence of Strapdown images.

2 Flight Dynamics 2.1 Basic Inertial Frames and Vectors

Figure 22:
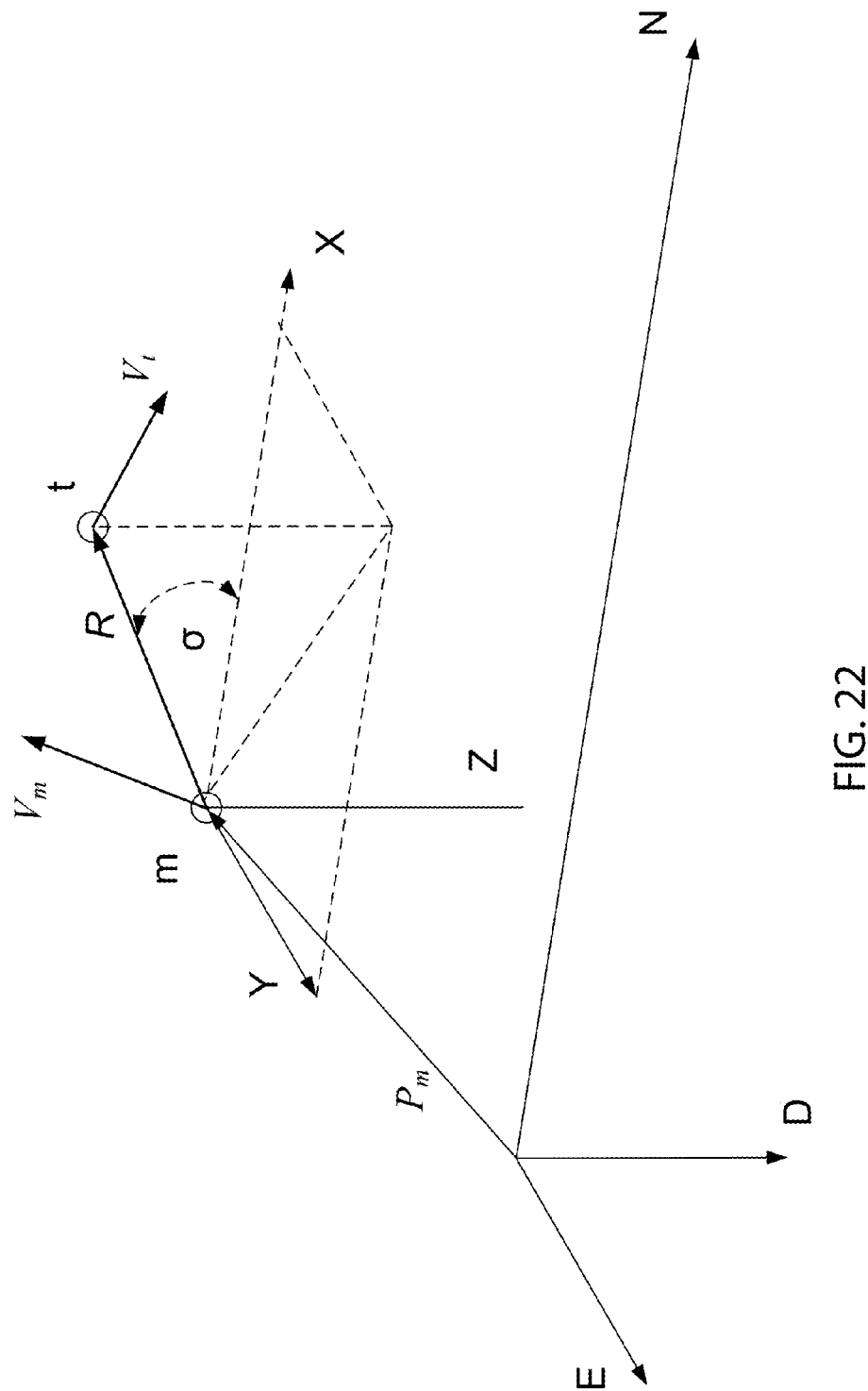
FIG. 22 is a first diagram and entitled "Inertial Coordinate Systems"

The earth-based inertial reference is the North, East, Down (NED) coordinate system shown in FIG. 22. The earth is assumed to be flat in this model. The Vector Pm is a position vector that points from the NED origin to the CG of the missile (m, shown in blue). A second very important inertial reference frame has its origin at the missile CG and has unit vectors (XYZ) that are parallel to NED. The inertial reference is instantaneously fixed in inertial space at the missile CG. As time progresses the inertial frame is moved to the CG, but always remains instantaneously fixed in inertial space. Three vectors are referenced in the XYZ frame: missile velocity, Vm; target velocity, Vt; and Range between target and missile, R. The target, t, is shown with a red circle. The Line Of Sight (LOS) angle between the target and the missile, F, is also presented in FIG. 22. Although not shown in FIG. 22, the angular rate of LOS (i.e., the F' vector) is an important variable. F' is discussed in Section 2.3.

2.2 Missile Dynamics

The dynamics of missile flight are computed in the XYZ inertial frame. The XYZ frame directly corresponds to the reference frame in commonly used hardware Inertial Navigation Systems, such as the CMIGITS or LN260. It follows the CG of the airframe and its axes always are aligned to the local North, East, and Down directions. In the TAGSIT flat earth model, that simply means that the missile's XYZ frame is always aligned parallel with FIG. 22's earth fixed NED coordinates.

Figure 23:
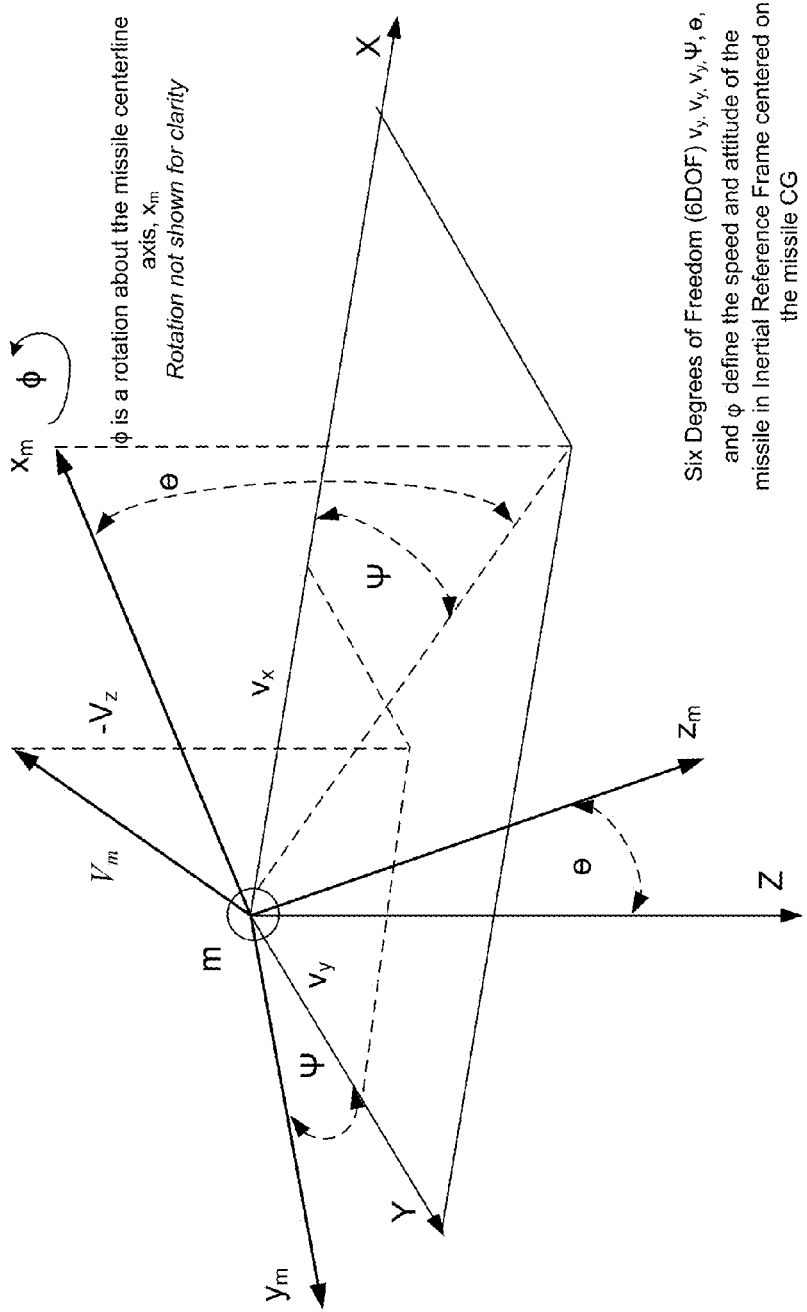
FIG. 23 is a second diagram entitled, "Missile Centered Inertial Frame is used to Compute Flight Dynamics"

FIG. 23 shows the important variables that are referenced to the XYZ frame. The missile velocity vector, V, has its three components Vx, Vy, and Vx shown in FIG. 23. A new coordinate system is introduced in FIG. 23. The $x_m y_m z_m$ coordinates are fixed to the missile body: $x_m$ points out the nose of the missile, $y_m$ points out the side, and $z_m$ points down through the bottom. The origin of $x_m y_m z_m$ is at the CG of the missile. Either quaternions or euler angles can be used to define the missile attitude relative to its inertial frame; FIG. 23 shows the euler angles. In order of rotation from XYZ to $x_m y_m z_m$, R is the missile yaw angle, 2 is the missile pitch angle, and M is the missile roll angle.

For background reference, an Inertial Measurement Unit (IMU) measures roll rates about the $x_m y_m z_m$ axes; these rates are commonly called p, q, and r. An IMU also measures accelerations along the $x_m y_m z_m$ axes. Given a known starting condition, these six measurements can be used to propagate the nine outputs of an Inertial Navigation System: R, 2, M, Vx, Vy, Vz, N, E, and D (or NED can be determined in lat, lon, and altitude). GPS updates in today's commercial INSs are used in conjunction with a Kalman filter to bound the errors in an open loop integration of the six measurements. In a 6DOF simulation, the truth model uses the same open loop integration equations (without measurement induced errors) to propagate the flight dynamics of the missile.

For TAGSIT, we will do a simpler 3DOF simulation that propagates position independent of attitude.

2.3 Vectors for Target to Missile Relative Dynamics

Figure 24:
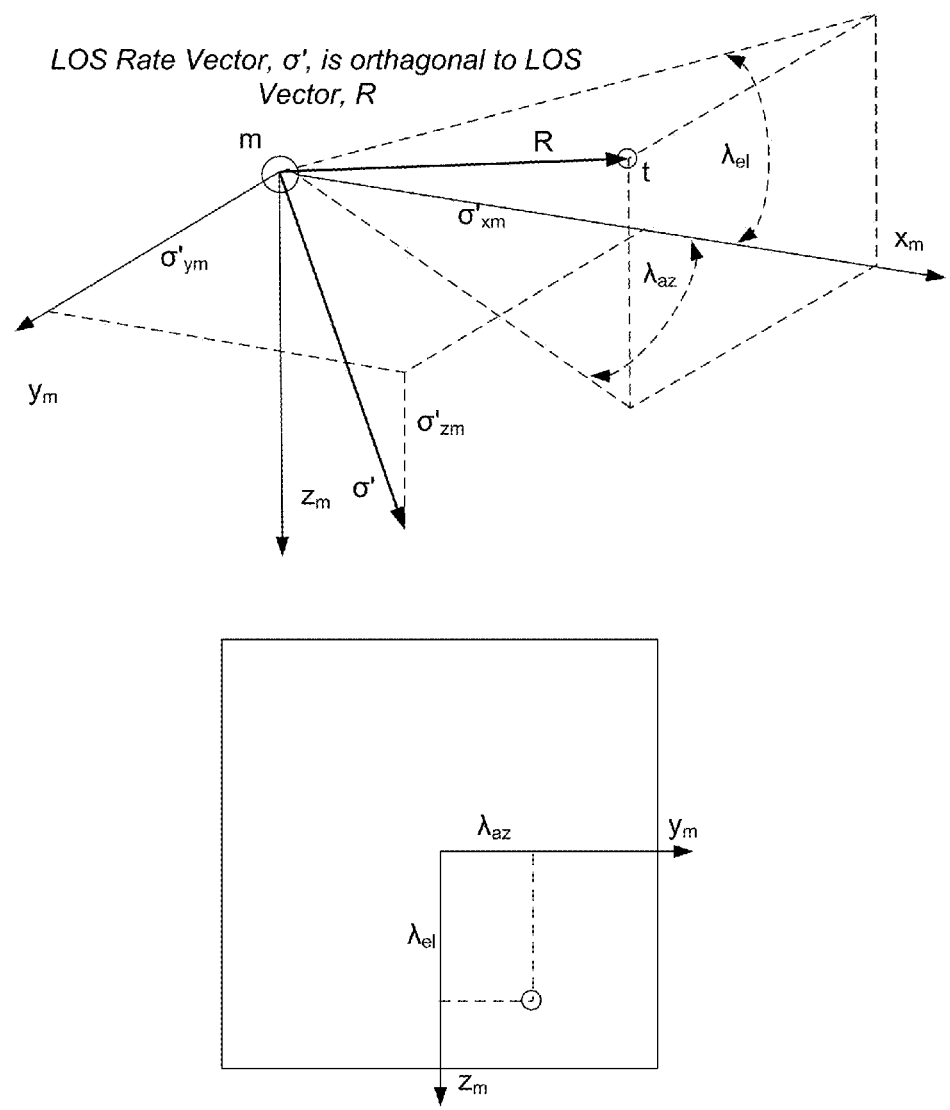
FIG. 24 is a third such diagram, "The Range and LOS Rate Vectors"
Figure 25:
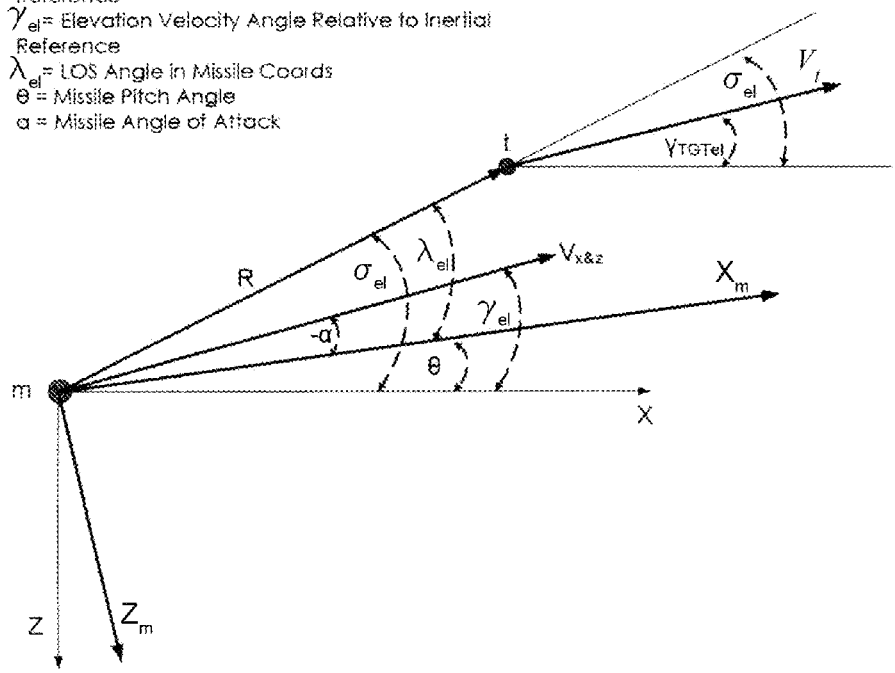
FIG. 25 is a fourth such diagram, "Vectors and Reference Frames in the Missile Vertical Plane"
Figure 26:
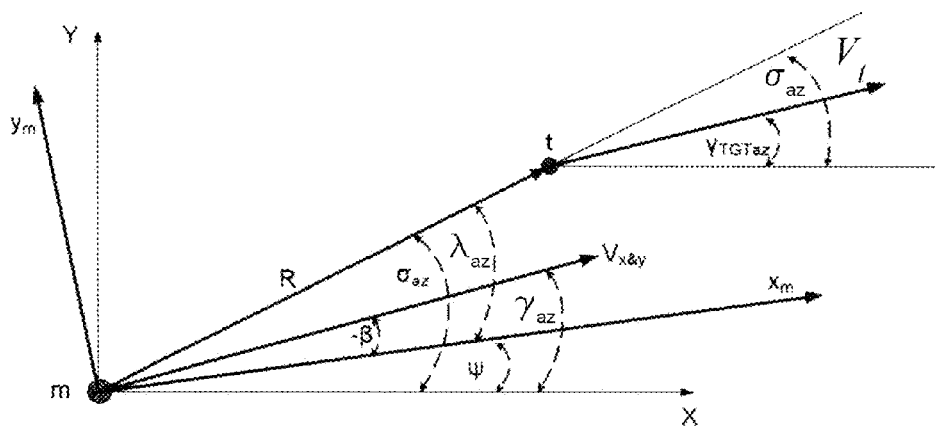
FIG. 26 is a fifth such diagram, "Vector and Reference Frames in the Missile Horizontal Frame"

The missile body coordinates $x_m y_m z_m$ are used to measure the important Range and LOS rate vectors. FIG. 24 shows the basic angle definitions. The position vector between the target and the missile, R, has two angles measured in the seeker: $\theta_{az}$ and $\theta_{el}$. They are measured in the missile body coordinates as shown in FIG. 24. Please note that the two views in FIG. 24 correspond to different points in time and hence do not have the target angles in the same position.

The LOS rate vector, F' is presented in FIG. 24. LOS rate is introduced by the relative motion of the target and the missile. F' is always perpendicular to R. It is the goal of the TAGSIT seeker to measure the magnitude of the inertial F' vector from a series of images collected in the rotating missile coordinate frame. Since we are ultimately going to steer the missile in the direction of the $y_m$ and $z_m$ axes, TAGSIT only needs to develop two components of F': $F'_{ym}$ and $F'_{xm}$. The precession of R about the $x_m$ axis ($F'_{xm}$) is not a variable that needs controlling in Proportional Navigation (ProNav).

3D Background Mathematics:

σ' is the LOS Rate Vector.

R is the Range Vector.

V is the relative Velocity Vector (i.e., V=Vt−Vm).

The generalized relationship between these inertial vectors is:

$$V = \sigma' \times R$$

σ' may be derived as follows:

$$R \times V = R \times (\sigma' \times R)$$

$$R \times V = (R \cdot R)\sigma' - (R \cdot \sigma')R$$

(R·σ')=0. Since R is orthogonal to, The equation for the LOS Rate Vector is then $$\sigma' = \frac{R \times V}{\|R\|^2}$$

And the Range Rate Vector is simply $$R' = \frac{V \cdot R}{\|R\|}$$

2.4 Truth Model in Missile Frames' Vertical Plane $\sigma'_{el}$=Elevation LOS Angle Relative to Inertial Reference $\tilde{a}_{el}$=Elevation Velocity Angle Relative to Inertial Reference $\ddot{e}_{el}$=LOS Angle in Missile Coords è=Missile Pitch Angle á=Missile Angle of Attack $V_{x\&z}$=Component of Missile Velocity in the pitch plane Scalar computation of the two things that we would like to be able to estimate in TAGSIT $$\sigma'_{el} = \frac{V_{x\&z}\sin(\sigma_{el} - \gamma_{el}) - V_t \sin(\sigma_{el} - \gamma_{tgtel})}{R}$$

$$R' = -V_{x\&z}\cos(\sigma_{el} - \gamma_{el}) + V_t \cos(\sigma_{el} - \gamma_{tgtel})$$

2.5 Truth Model in Missile Frames' Horizontal Plane
σ'$_{az}$=Azimuth LOS Angle Relative to Inertial Reference
ã$_{az}$=Azimuth Velocity Angle Relative to Inertial Reference
ë$_{az}$=LOS Angle in Missile Coords
èe=Missile Pitch Angle
β=Missile Yaw Angle of Attack (sideslip for aircraft)
V$_{x\&y}$=Component of Missile Velocity in the Yaw Plane
Scalar computation of the two things that we would like to be able to estimate in TAGSIT $$\sigma'_{az} = \frac{V_{x\&y}\sin(\sigma_{az} - \gamma_{az}) - V_t\sin(\sigma_{az} - \gamma_{tgtaz})}{R}$$

$$\frac{R'}{R} = \frac{V_{x\&y}\cos(\sigma_{az} - \gamma_{az}) - V_t\cos(\sigma_{az} - \gamma_{tgtaz})}{R}$$

3 LOS Angular Rate Estimation (LOSARE)

The fundamental concept of LOSARE is to measure the motion of the target relative to earth fixed background scenes. The earth provides an inertial reference. The optical flow rate of background image contrast around the target is a measurement of LOS rate. Two methods for deriving LOS rate, F', are presented in this section. The first method registers imagery about the target and performs Optical Flow calculations to measure the speed at which background contrast flows around the target. The second method registers the background contrast of the entire imagery and measures the number of pixels that the target has moved from one frame to the next. Final choice of algorithm implementation will depend on hardware implementation implications and algorithm robustness.

Figure 27:
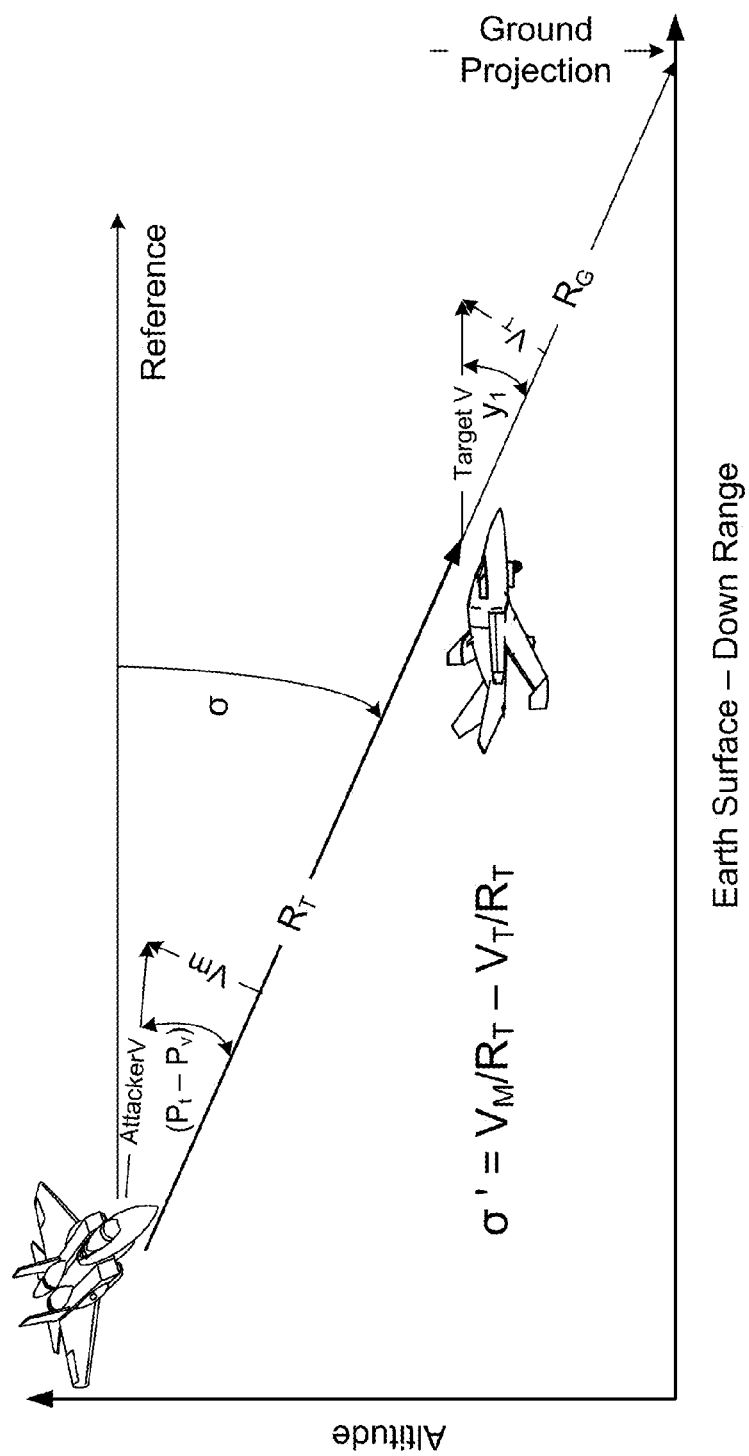
FIG. 27 is a sixth such diagram, "Single Plane Details of the LOSARE Measurement"

The accuracy of the LOSARE measurement depends on the geometry of the objects. FIG. 27 shows a typical geometric relationship of a single plane intercept engagement. The LOS Vector, Rt, points from the attacker centroid to the target centroid. Another Vector, Rg, points along the LOS, but its magnitude is the range from the target to the ground along the LOS. Vm and Vt are the components of vehicle velocities perpendicular to the LOS.

Figure 28:
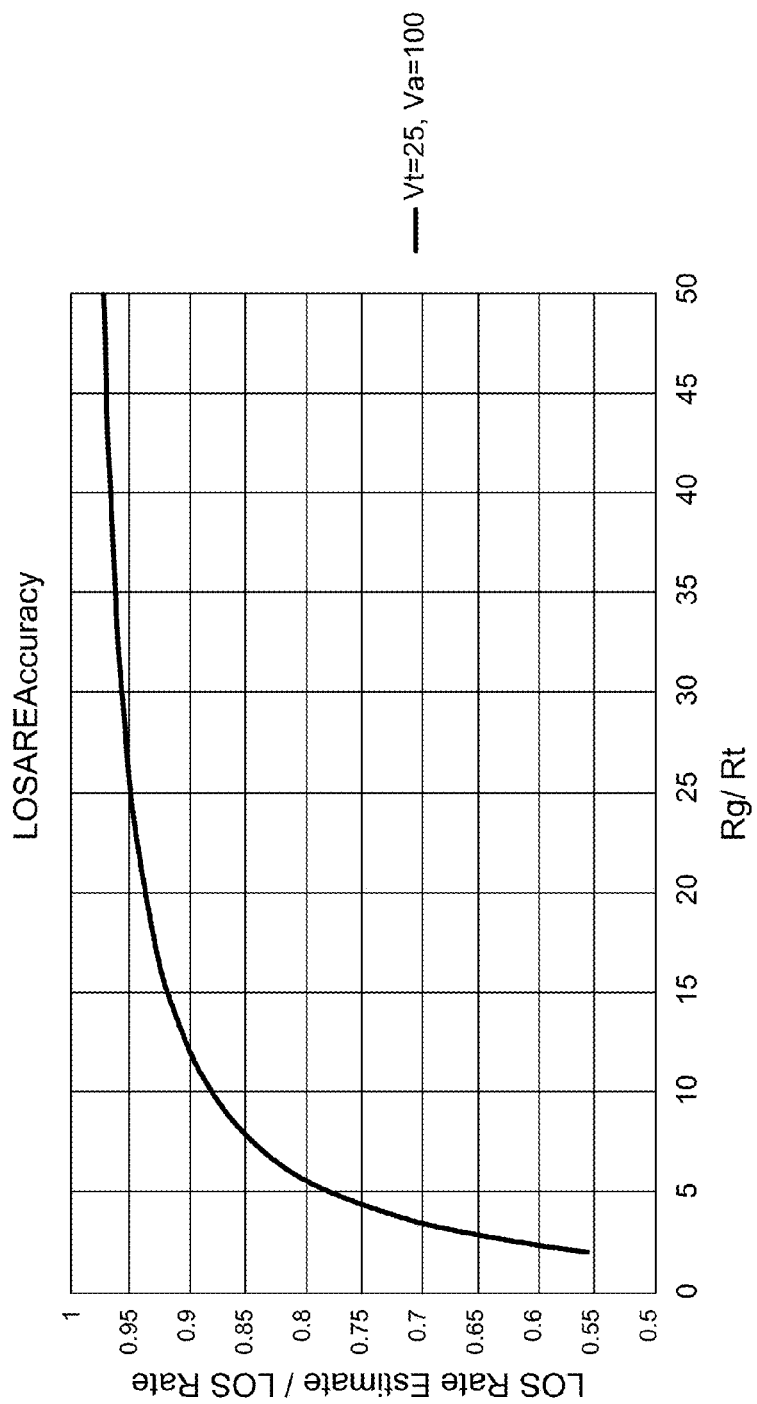
FIG. 28 is a seventh illustration, a graph entitled, "LOSARE accuracy"

OFm LOSARE estimates by measuring the relative motion of the target and the earth based background scene as viewed along the LOS Vector. An imaging sensor measures this relative motion, in units of number of pixels per frame time, which directly converts to units of radians/sec. The accuracy of LOSARE is dependent on the engagement geometry as shown in the "LOSARE equation" below $$\sigma' \sim OF_m = \frac{R_G}{R_T(R_G + R_T)}V_M - \frac{V_T}{R_T}$$

σ' When the target is on the ground, LOSARE measures the contribution of LOS rate due to target motion. For an airborne target, the LOS rate estimate approaches the true value of σ', as Rt becomes small relative to Rg. The accuracies of the LOSARE method for determining LOS rate at the specified target and aircraft speeds are shown in FIG. 28.

The effects of this distortion of the true LOS rate on the terminal guidance performance were studied parametrically using a single plane simulation. At t=0, the missile is 600' from the target with its velocity vector on the LOS to the target. The target is flying straight and level with its velocity perpendicular to the LOS. TAGSIT guidance is then initiated. The performance impacts and interaction of the parameters Rg and Vt were the primary focus of the study. Plots of the lateral separation (i.e., Ytgt−Ymsl) vs. time and lateral acceleration vs. time were generated. The appendix to this document contains the graphs generated in the study. Below is a brief summary of the study's results.

For V, =25 ft/sec and Vm=100 ft/sec:
Successful intercepts were made for R, at least 150 ft.
The full benefits of Proportional Navigation were achieved for Rg of at least 500 ft.
For Rg=500 ft and Vm=100 ft/sec:
Successful intercepts were made for Vt less than or equal to 60 ft/sec.
For Rg=2000 ft and Vm=100 ft/sec:
Successful intercepts were made for Vt less than or equal to 80 ft/sec.
The full benefits of Proportional Navigation were achieved for Vt less than or equal to 50 ft/sec
Notes:
100 ft/sec=68 mph
Intercepts worked just as well with Vm=150 and 200 ft/sec)

3.1 Method 1—Optical Flow

Figure 29:
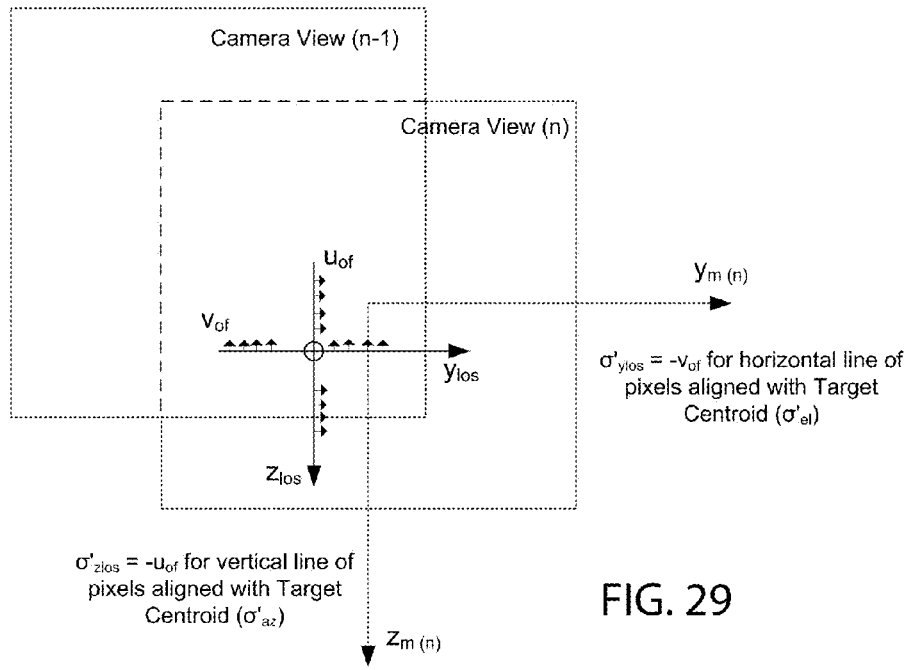
FIG. 29 is an eighth illustration, a diagram entitled, "LOSARE can use frames registered in the LOS coordinate system to compute the Optical Flow calculations that produce the desired LOS rate estimate"

Two image frames collected from the imaging sensor or (Camera View) can theoretically be registered in the LOS coordinate frame as shown in FIG. 29. Optical Flow computations in the region surrounding the target will produce intensity flow rates that are equal to the LOSARE equation. In particular, as shown in FIG. 29, the values of the Optical Flow along the y$_{los}$ and z$_{los}$ coordinate axes equal the LOS rate estimates. Averaging over the pixels along these lines would improve the signal to noise ratio.

This presents the problem of registering the frames in the LOS coordinate system. The missile's angular rate vector, with components p, q, and r cause changes to successive image frames. An example of this can be seen in FIG. 30.

The missile angular velocity vector can be viewed from the LOS coordinate frame by going through a coordinate transformation matrix.

$$\begin{pmatrix} plos \\ qlos \\ rlos \end{pmatrix} = [C] \begin{pmatrix} p \\ q \\ r \end{pmatrix}$$

Figure 30:
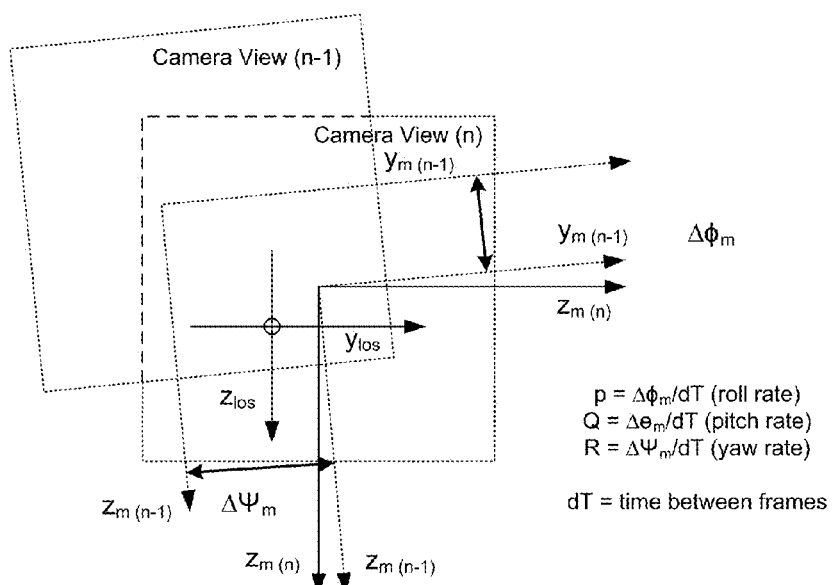
FIG. 30 is a ninth such diagram entitled, "Consecutive Image angular Frames tilted by the missile angular motion"
Figure 31:
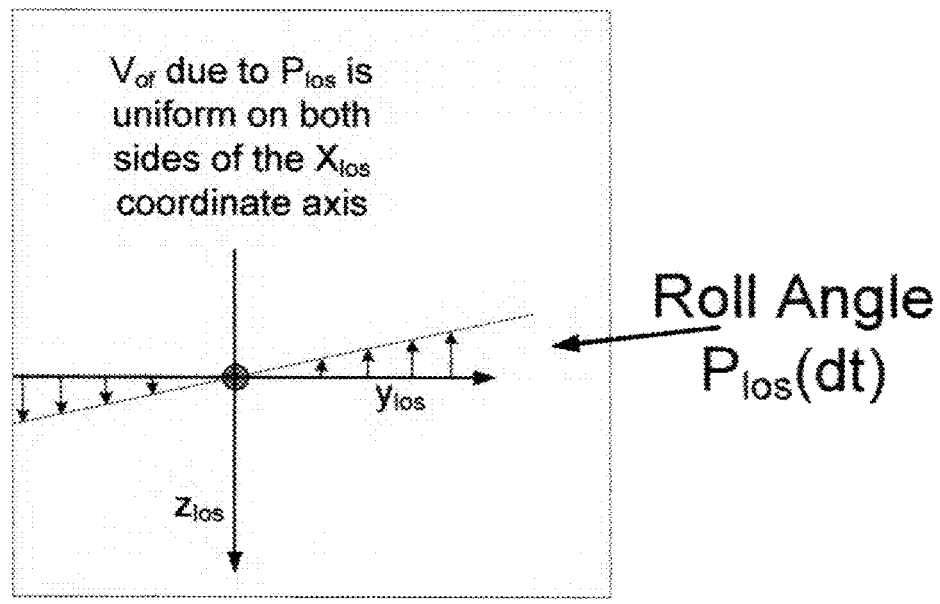
FIG. 31 is a tenth such diagram entitled, "Roll coupling into the registration of image frames.

The LOS is the R vector that points at the target and the xlos coordinate is defined to be aligned with R. Computing a target centroid in each of the two frames and using that centroid to register the frames eliminates the motion of qlos and rlos. As indicated in FIG. 30, the component of missile roll, about the xlos coordinate is still contributing to the calculated optical flow intensity rates. It is critical to eliminate this coupling of the body motion into the inertial LOS calculations. FIG. 31 illustrates how we can eliminate the roll coupling. The actual optical flow calculation will compute the sum of the flow vectors shown in FIG. 29 and FIG. 31. In order to compute the desired values of FIG. 29, an average over a range of pixels that is equidistant from the target centroid should eliminate the roll coupling component and provide enhanced signal to noise ratio in the final answer.

3.2 Method 2—Target Centroid Distance within Two Registered Image Frames

This method applies registration technology across the entire field of view to create the inertial reference. The target moving relative to this registered reference information can be measured by the video tracker. FIG. 9 shows a block diagram of this approach. Critical to the success of implementing this approach with a minimal embedded circuit footprint is the use of the MEMS gyro information to get a rough registration. This reduces the search space for the correlation of the Frame (n) and Frame (n−1) images. This is the preferred method from an algorithm robustness and accuracy risk viewpoint. If the hardware design is sufficiently small in size, weight, and power, then this approach should be used.

σ' The conversion of the LOSARE output into components of LOS rate is shown in FIG. 10. Note that a linear measurement in fractional pixels converts to an angular measurement about its orthogonal axis. Fractional pixels are converted to angles by multiplying the Instantaneous Field of View (IFOV), which is measured in radians. The time between image frames, dT, is measured in seconds. The LOS Rate, σ', is sent to the Guidance algorithms in units of radians/sec.

4 Air to Air TAGSIT Equations for Proportional Navigation 4.1 Constructing Acceleration Commands The general form for proportional navigation is:

Acmd=NR'σ'

The Navigation Ratio, N, is typically in the 3.5 to 4.0 range.

The range rate, R', is typically not known for passive EO/IR seekers. In AIM-9M Sidewinder missiles, the range rate is set to ensure sufficient gain for incoming targets. For "tail chase" scenarios, the gain was higher than optimal, but was accurate enough for intercepts. For TAGSIT, we will take the same approach.

TAGSIT Acceleration Command Equations in LOS coordinates are:

$$Aylcmd = 4(Vm+Vest)\sigma'zlos$$

$$Azlcmd = -4(Vm+Vest)\sigma'ylos$$

$$Vest = 37 \text{ ft/sec(25 mph)}$$

$$Vm = \text{Speed from Procerus autopilot(ft/sec)}$$

4.2 Converting Acceleration Commands to Autopilot Controls

In 1980's missiles such as Standard and Sidewinder, the acceleration commands would be computed in LOS coordinates and then implemented directly in missile coordinates. With seeker "look angles" of 20< or 30, small angle assumptions worked fine for guidance. We could implement:

$$Ay_{cmd} = Ayl_{cmd}$$

$$Az_{cmd} = Azl_{cmd}$$

For TAGSIT we should implement the acceleration commands into missile body frames using the following transform equations:

$$Ay_{cmd} = Ayl_{cmd} \cos(\lambda az)$$

$$\lambda el_{cmd} = Ayl_{cmd} \sin(\lambda az)\sin(\lambda el) + Azl_{cmd}\cos(\ )$$

5 TAGSIT Requirements 5.1 Camera and Lens

Figures 32, 33:
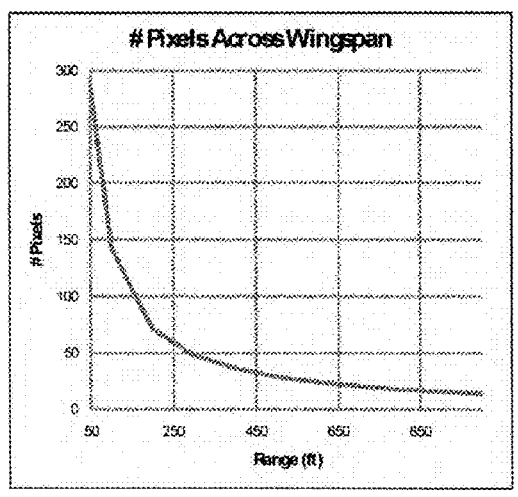
FIG. 32 is an additional graph entitled, "Size of Target in Camera View.
FIG. 33 is a tabulation entitled, "Camera and Lens Performance"

The selected camera and lens provide a FOR of −70<×50< and the ability to move a 640×480 window anywhere within that FOR at each 30 Hz image frame. This will be used as a digital gimbal in the TAGSIT sensor in order to keep the target in view throughout the FOR. The 640×480 FOV will cover 11.7<×8.7<. FIG. 32 shows how many pixels the wingspan of a Raven will cover as a function of range. The detection, recognition, and identification range performance against a Raven UAV sized target is shown in FIG. 33, along with the basic parameters of the camera and lens.

Figure 34:
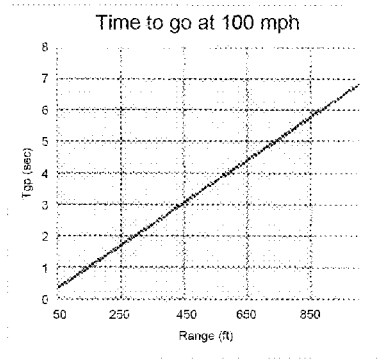
FIG. 34 is a graph entitled, "Time-to-go vs. Range"
Figure 35:
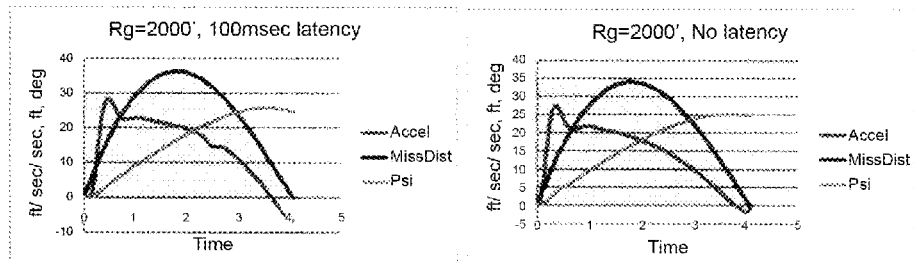
FIG. 35 is pair of graphs entitled, "Latency Simulation with Rg=2000 feet"

For the nominal attack speed of 100 mph, the time-to-go as a function of range, is shown in FIG. 34. With 50 feet to go, there is no more time to significantly change the impact point. (There may be time to change the attitude of the missile to point a warhead blast towards the target.) Based on this scenario, the tracker must be able to keep lock on the target and estimate an aimpoint for a target that could be as small as 5 pixels or as large as 300 pixels.

The aimpoint shall be estimated in fractional pixels to avoid quantization steps in the acceleration commands. If integer pixels are used to drive the LOSARE math, then the Acceleration command would have a quantized output of 0.22 g's. Fractional aimpoint calculations will ensure smoother commands are sent to the autopilot. Computing aimpoints to an LSB of 1/16" of a pixel will ensure a smooth acceleration command. (1/8th is likely OK too).

5.2 Processing Latency

Figure 36:
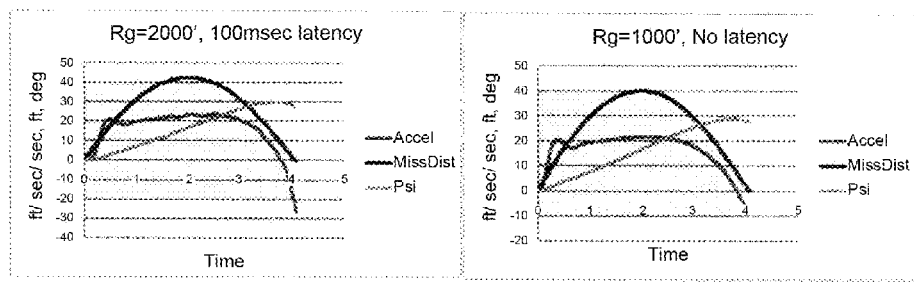
FIG. 36 is a like pair of graphs, but for Rg=1000 feet.

A transport delay was added to the output of the acceleration command in the TAGSIT simulation. The next figure shows both the behavior of the system with no latency and the behavior with 100 msec of transport delay (~3 image frames of latency). A successful intercept occurred with 100 msec of latency, but it did cause oscillations in the acceleration command indicating marginal stability. FIG. 36 shows that changing Rg to 1000' did not change the effect of 100 msec of latency on the system.

Figure 37:
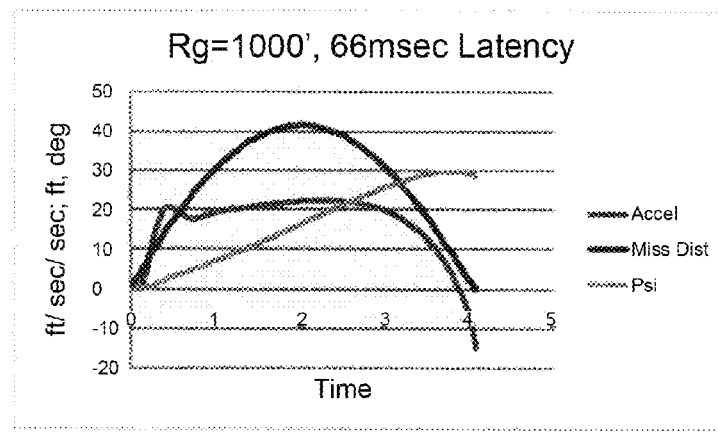
FIG. 37 is an additional graph entitled, "Simulated Performance at the Specified Latency Requirement and Rg=1000 feet"

Based on the oscillatory behavior, 100 msec is too much latency. The requirement for processing latency is two image frames, which is 66 msec. The performance with this specified requirement is shown in FIG. 37.

6 Air-to-Air LOSARE Measurement

Figure 38:
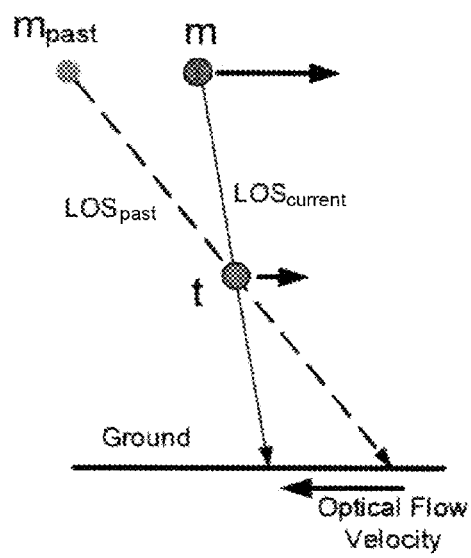
FIG. 38 is a further diagram entitled, "Basic Concept for Air-to-Air LOSARE"

The basic idea is shown in FIG. 38. The sensor tracks the target as the missile approaches. The LOS vector points from the missile to the target. The background contrast behind the target provides an inertial reference as we measure the relative motion between the target and the ground, as observed by the missile seeker. The rate at which background contrast moves around the target is measured by the LOSARE seeker. This rate is measured as an angular rate by the camera. The derivation that follows explains the relationship between the LOSARE measurement and the actual LOS rate between the missile and the target.

Figure 39:
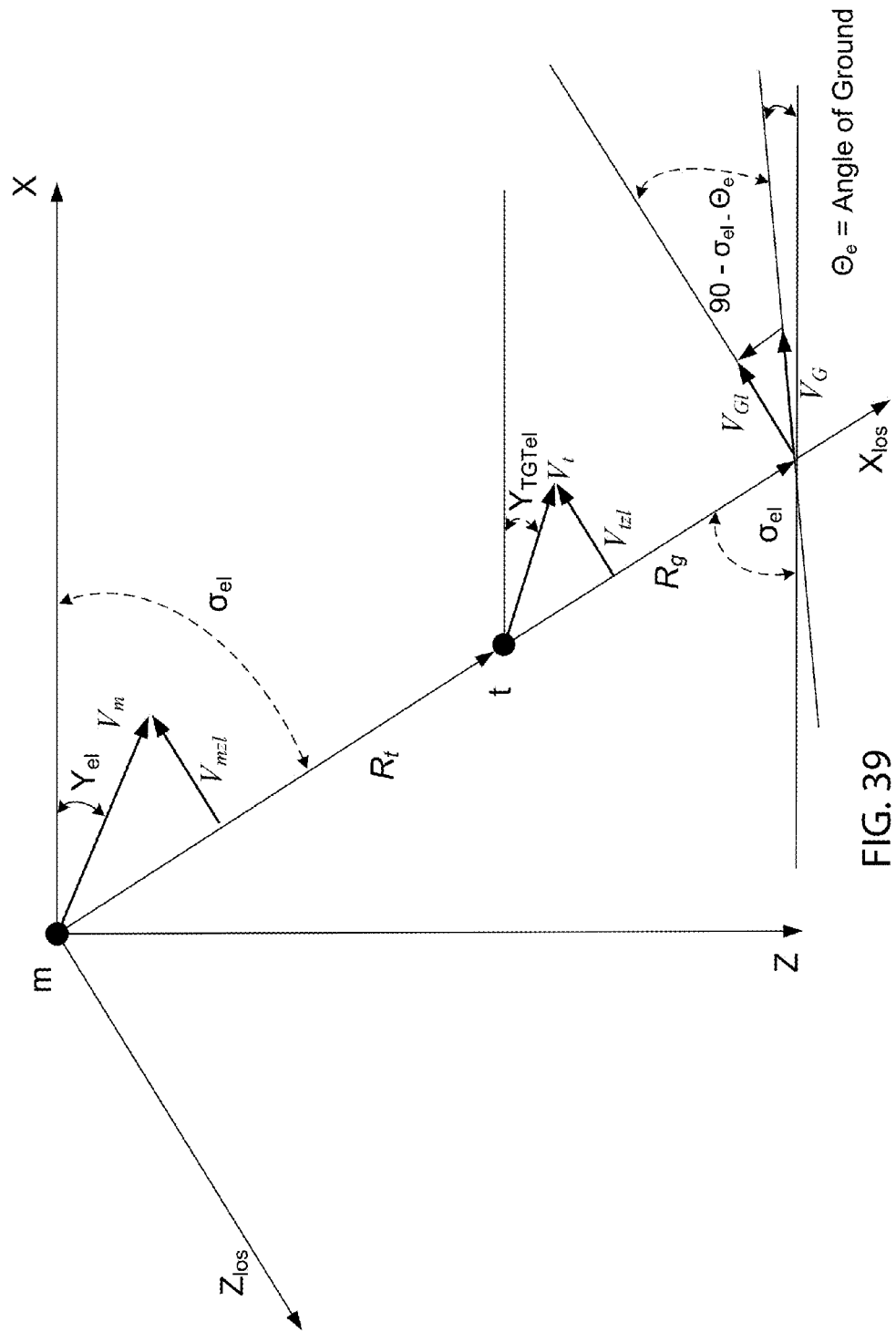
FIG. 39 is another diagram, "Coordinate System and Definitions for the Vertical Plane LOSARE Calculation"
Figure 40:
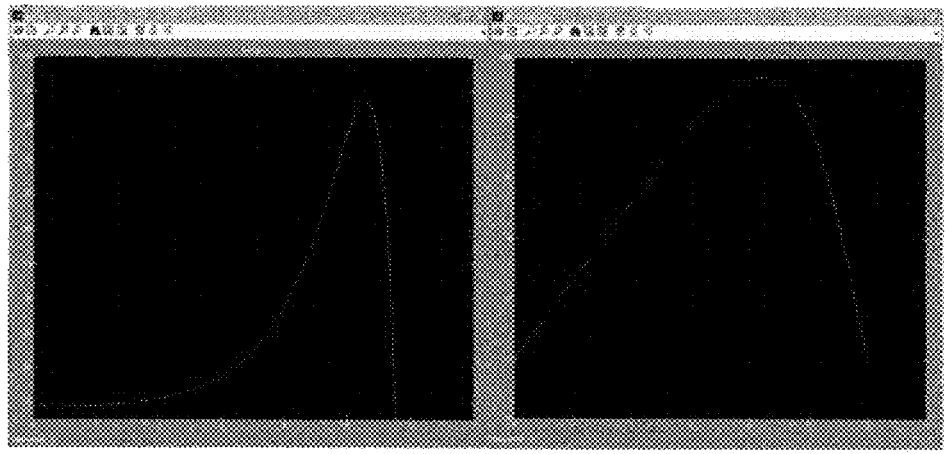
FIG. 40 is a pair of traces, "100 fps missile, 25 fps crossing target, RG=150'"
Figure 41:
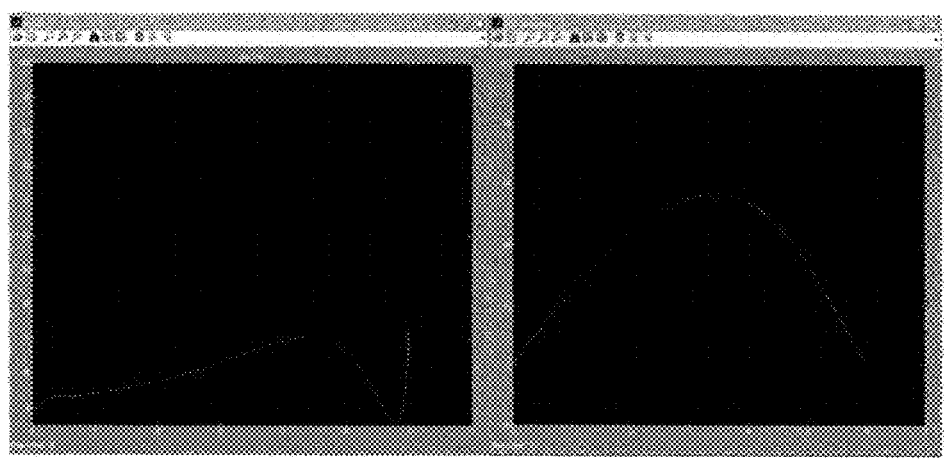
FIG. 41 is a like pair of traces, "100 fps missile, 25 fps crossing target, RG=300'"
Figure 42:
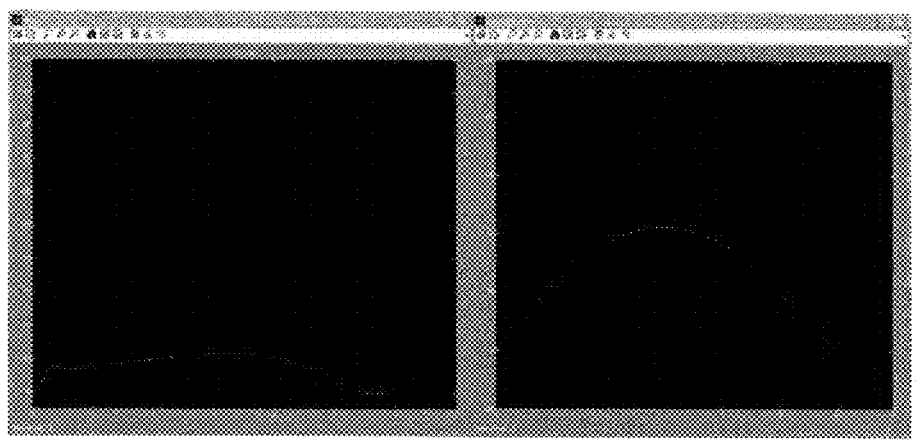
FIG. 42 is another trace pair, "100 fps missile, 25 fps crossing target, RG=500'"
Figure 43:
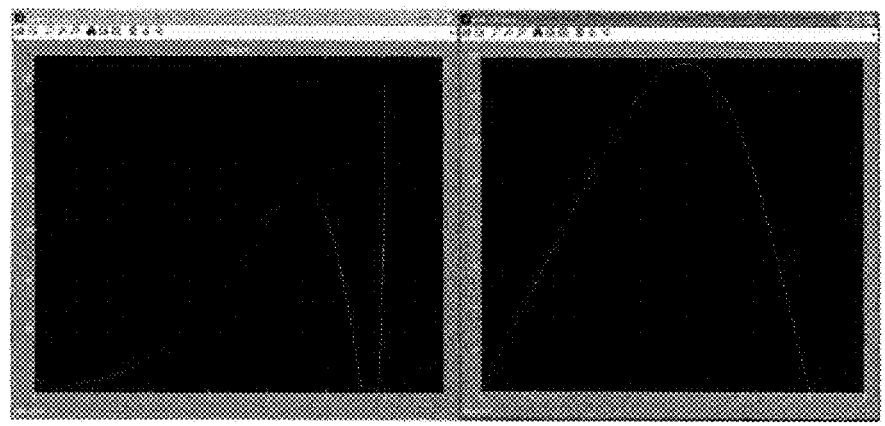
FIG. 43 is another trace pair, "100 fps missile, 50 fps crossing target, RG=500'"
Figure 44:
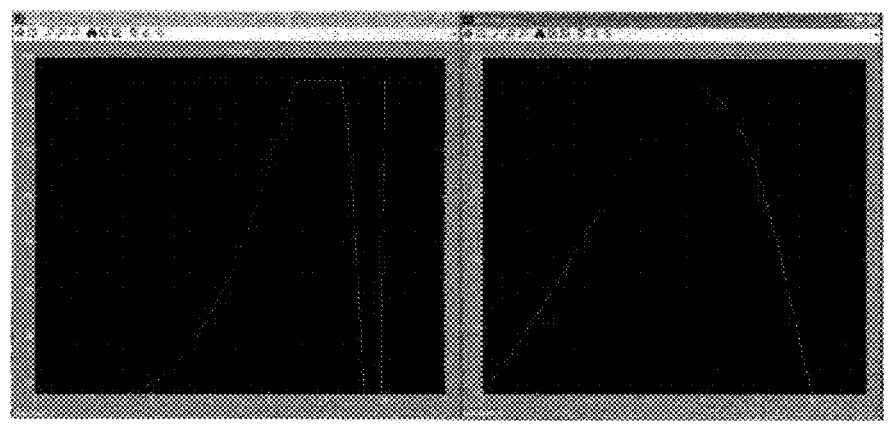
FIG. 44 is another trace pair, "100 fps missile, 60 fps crossing target, RG=500'"
Figure 45:
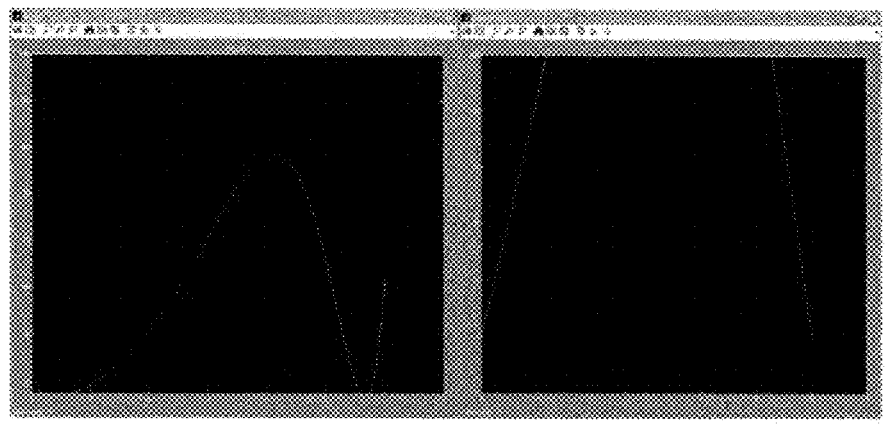
FIG. 45 is another trace pair, "100 fps missile, 80 fps crossing target, RG=2000'"
Figure 46:
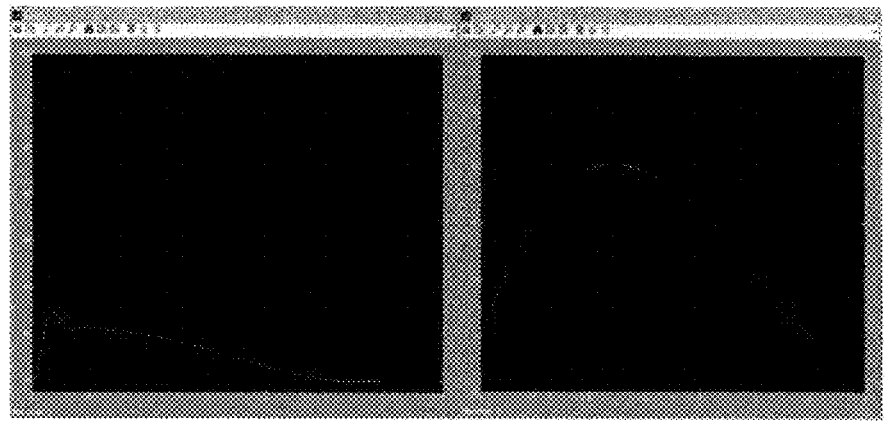
FIG. 46 is another trace pair, "100 fps missile, 50 fps crossing target, RG=2000'"

The angles and vectors, in the vertical plane, for the complete LOSARE calculation are shown in FIG. 39. The derivation uses superposition to determine the value of the measurement. The contribution due to missile motion is calculated first, followed by the contribution due to target motion. These two components are then added together. The derivation assumes small angular changes in LOS between measurements.

6.1 Contribution Due to Missile Motion

Assume the target is stationary and the missile is flying at some arbitrary velocity as shown in FIG. 39. The target becomes the pivot point for LOS motion.

$$V_{mzl} = V_m \sin(\gamma_{el} - \sigma_{el})$$

$$\sigma'_{elm} = -\frac{V_{mzl}}{R_t}$$

$V_{Glm}$ is the component of $V_{Gl}$ due to missle $$V_{Glm} = V_{Gm} \cos(90 - \sigma_{el} - \theta_e)$$

$$\sigma'_{elm} = \frac{V_{Glm}}{R_g}$$

Substituting for $\sigma'_{elm}$ leaves the observed ground motion due to missile motion.

$$V_{Glm} = -\frac{V_{mzl}}{R_t} R_g$$

6.2 Contribution Due to Target Motion

Assume that the missile is stationary and flying as shown in FIG. 39. The missile is the pivot point for LOS angular motion.

$$V_{tel} = V_t \sin(\gamma_{TGel} - \sigma_{el})$$

$$\sigma'_{elt} = \frac{V_{tzl}}{R_t}$$

$V_{Glt}$ is the component of VGl due to target motion $$V_{Glt} = V_{Gt} \cos(90 - \sigma_{el} - \theta_e)$$

$$\sigma'_{elt} = \frac{V_{Glt}}{(R_g + R_t)}$$

Substituting for $\sigma'_{elt}$ leaves the observed ground motion due to target motion.

$$V_{Glt} = \frac{V_{tzl}}{R_T}(R_g + R_t)$$

6.3 Total Observed Ground Motion

The total ground motion is determined by superimposing the two components of Velocity.

$$V_{Gl} = -\frac{V_{mzl}}{R_t} R_g + \frac{V_{tzl}}{R_t}(R_g + R_t)$$

The seeker observes this ground motion through optics that measure the angular motion over a moment are equal to $(R_g + R_t)$
Therefore, $$\sigma'_{el} = \frac{V_{Gl}}{(R_g + R_t)}$$

and $$\sigma'_{el} = -\frac{R_g}{(R_g + R_t)} \frac{V_{mzl}}{R_t} + \frac{V_{tzl}}{R_t}$$

which is the approximation of LOS rate as measured by the LOSARE algorithm.
For $R_g \gg R_t$ the LOSARE measurement approaches the true LOS rate.
For $R_g = 0$ the LOSARE measurement correctly measures the LOS rate due to target motion only.

Summary of Terminal-Guidance Concepts

Introduction

This document gives a brief overview of the technical concepts of the TAGSIT system.

"Two objects are on a collision course when the inertial Line of Sight vector between them maintains a constant direction, but is decreasing in magnitude."

Sailors employ PG by measuring the angle between a feature on the shore (an inertial anchor) and another maritime vessel. If that angle remains constant (A constant bearing), then there is the possibility of a collision, and the sailor will change course. Note that this works regardless of the ships orientation.

Missile Guidance engineers use expensive gyros and detectors to measure the movement of their targets in inertial space. They then use that information in the control system to hold the inertial LOS direction constant.

Proportional Guidance Mathematical Foundation

This section gives a quick mathematical derivation as to why PG works. It is done in 2D with the understanding that a 3D PG problem can always be worked instantaneously in a 2D fashion within the plane formed by the LOS vector between the two objects of interest and the objects' relative velocity vector.

Figure 47:
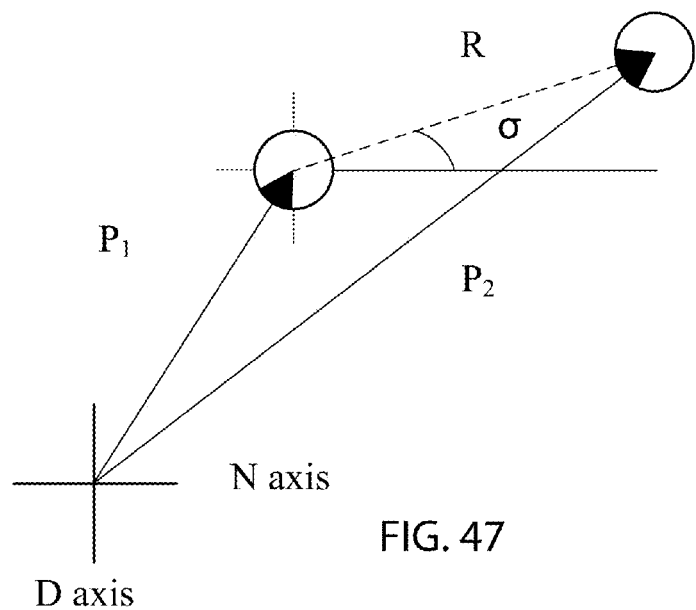
FIG. 47 is a further diagram entitled, "Two moving objects in an inertial system"

FIG. 47: Two moving objects in an inertial system

FIG. 47 shows two objects in an inertial coordinate system (North, East, Down): a Missile at P1 and a target at P2. The claim is that if the angle sigma remains constant and R decreases in magnitude, then the two objects will collide.

Proportional Guidance Concept Proof

Newton was kind enough to show us the following:

$$\vec{P_1}(t) = \vec{V_m} t - \vec{P_1}(0)$$

$$\vec{P_2}(t) = \vec{V_t}(t) - \vec{P_2}(0)$$

I am not sure whom to give credit for this gem, but we need it $$\vec{R}(t) = \vec{P_2}(t) - \vec{P_1}(t)$$

A Proper Collision Condition would be that $$\vec{R}(t) = \begin{bmatrix} 0 \\ 0 \end{bmatrix}$$

So what must be shown is that our constraint will result in R being a null vector in the future.
To do this, we need to formalize our constraint $$\sigma(t) = \tan^{-1}\left[\frac{R_y(t)}{R_x(t)}\right] = \alpha$$

Where alpha is a constant.
I will now use a little trig and algebra to rewrite the constraint as $$R_y(t) = \beta R_x(t)$$

Where beta is a constant.
Conveniently enough this shows us that the constraint forces the components of R to be related via a scale factor. In other words, it is not possible for R to have a single null component unless it is in fact the null vector. Technically, that conclusion breaks down if beta is 0; however, if beta is zero then alpha and thus sigma are zero and the pursuer is simply chasing the target along the N axis. What must be shown now is the condition under which R will be null in the future.

Combining the equation for R with what Newton gave us and writing it piecewise.

$$\vec{R}(t) = \begin{bmatrix} (V_{tx} - V_{mx})t + R_x(0) \\ (V_{tx} - V_{mx})t + R_x(0) \end{bmatrix} = \begin{bmatrix} R_x(t) \\ R_x(t) \end{bmatrix}$$

Using our constraint we need only to show when one of the components goes to zero. Using the x component we find:

$$R_x(t) = (V_{tx} - V_{mx})t + R_x(0) = 0$$

$$t = \frac{-R_x(0)}{(V_{tx} - V_{mx})} = \frac{R_x(0)}{(V_{mx} - V_{tx})}$$

Where future times are indicated by positive values of t.
We will drive $R_x$ to zero in the future when $(V_{mx} - V_{tx})$ is positive. By application of our constraint, $R_y$ will also be driven to zero at the same time. The resulting null vector implies a collision. Thus we can feel confident that our claim about FIG. 1 is correct:

The Conclusion
If the angle sigma remains constant and R decreases in magnitude, then the two objects will collide. We therefore want to find a way to hold sigma constant Applying Proportional Guidance
This section deals with the control systems part of PG. It attempts to answer the following question: "Given that we must hold an inertial angle constant, how do we do that?" The simple answer is that we will attempt to drive the magnitude of sigma's temporal derivative to zero.

Figure 48:
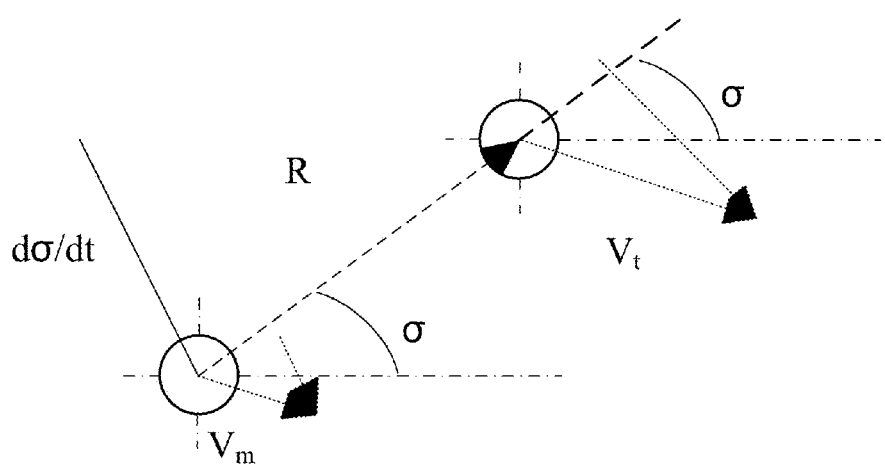
FIG. 48 is a like diagram entitled, "This figure shows the relationship between the LOS vector and the velocity vector of a Missile and a Target"

Sigma's Derivative in Control Systems
FIG. 48: This figure shows the relationship between the LOS vector and the velocity vectors of a Missile and a Target.
The relationships in FIG. 48 provide us with all the information we need to calculate sigma dot. Assuming that the doted velocity vectors are the velocity components orthogonal to the LOS vector, we can again thank Newton for the following:

$$|\vec{\sigma}| = \frac{V'_m}{P_3} - \frac{V'_t}{P_3}$$

Where the primed Vs are orthogonal to R and sigma dot is orthogonal to both R and the vector formed by (Vt−Vm) •
To drive this sigma dot term to zero, missile guidance engineers apply an acceleration in the plane defined by the sigma dot vector. The orientation in which one applies the acceleration within that orthogonal plane is what determines if the proportional navigation is "pure", "true", or something else. The magnitude of the acceleration used is:

$$|\vec{a}| = NV_{Closing} |\vec{\sigma}|$$

Where N is a scaling constant of about 4, $V_{Closing}$ is the closing velocity between the missile and the target, and sigma dot is the line of sight rate. Neither the N term nor the $V_{Closing}$ term is incredibly consequential because what you are trying to do is drive to a condition where sigma dot is zero at which point the acceleration command will be zero regardless of N or the $V_{Closing}$ term.

Determining how to apply this inertial space acceleration vector in the body frame is not demonstrated here. For now we simply mention that we need a way to use this inertial space information in a frame that the missile's control system can affect. In our case that frame is the missile body frame.

To keep sigma constant one needs to be able to measure sigma dot in an inertial frame, and then issue commands in the missile body frame in such a way that it drives sigma dot to zero in inertial space.

Imaging Systems
TAGSIT relies on imaging systems and so this section will outline a framework for viewing imaging sensors that allows us to construct the sigma dot parameter.

Imaging as a Physical Mapping
For the purposes of TAGSIT, we will consider the act of imaging as a method for physically mapping objects in a 3D world to the angular coordinates of a spherical coordinate system originating at the imager.

Figure 49:
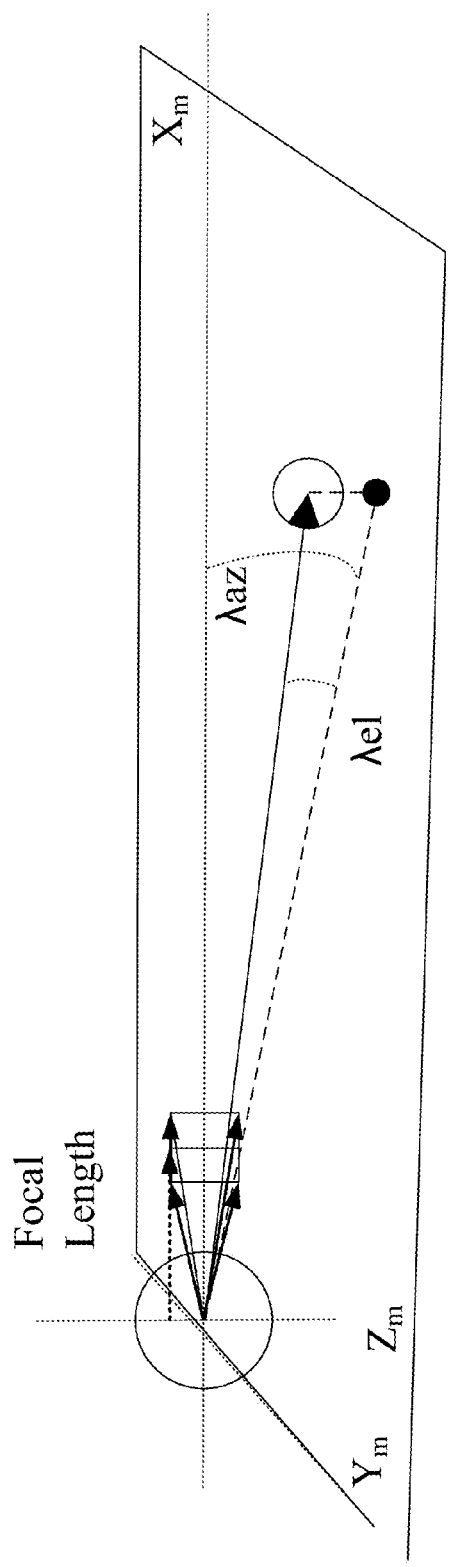
FIG. 49 is another like diagram entitled, "Imaging performs a physical mapping into other angles of a spherical coordinate system originating at the camera"

FIG. 49: Imaging performs a physical mapping into the angles of a spherical coordinate system originating at the camera This interpretation can be thought of as a natural extension of the pinhole camera model that maps points in 3D space onto a 2D plane (the focal plane array). The focal plane is of course located at a focal length distance from the origin of the camera system. By identifying the pixel an object was mapped to in the focal plane and knowing the distance to the focal plane it is possible to determine the $\delta_{az\ and}\lambda_{el}$ coordinates of the mapped object in camera space.

There are 2 ways to determine the angles. The first is valid for a small angle approximation.

$$\lambda_{az} = \left(Y_m Pixelindex - \frac{TotalY_m Pixels}{2}\right) * IFOV_y$$

$$\lambda_{el} = \left(Z_m Pixelindex - \frac{TotalY_m Pixels}{2}\right) * IFOV_x$$

The second method is valid for wider angles:

$$\lambda_{az} = \tan^{-1}\left[\frac{Y_m Pixelindex - \frac{TotalY_m Pixels}{2}}{FocalLength}\right]$$

$$\lambda_{az} = \tan^{-1}\left[\frac{Z_m Pixelindex - \frac{TotalY_m Pixels}{2}}{\sqrt{\left(Y_m Pixelindex - \frac{TotalY_m Pixels}{2}\right)^2 + FocalLength^2}}\right]$$

Using this interpretation of imaging, a series of imagers can be thought of as providing a series of $\lambda_{az\ and}\lambda_{el}$ values for trackable objects that remain within the FOV. To perform PG we need to have a way of using those $\lambda_{az\ and}\lambda_{el}$ values to generate sigma dot.

LOSARE Algorithm
The LOSARE Algorithm takes the $\lambda_{az\ and}\lambda_{el}$ values generated during imaging and uses them to determine sigma dot. This section will go over a series of examples. And describe how the acquired images can be used to estimate sigma dot. In all of the examples it is assumed that there is a target in the scene that is moving against an inertially fixed background.

Stationary/Non-Rotating Imager
In the case of a stationary and non-rotating imager the camera frame is also an inertial frame, and so thanks again to Newton (Man I love that guy) we can say that what we measure in the camera frame is also what is measured in an NED inertial frame. Thus we can say that sigma dot is just the difference in recorded $\lambda_{az\ and}\lambda_{el}$ values divided by the time between the images.

Figure 50:
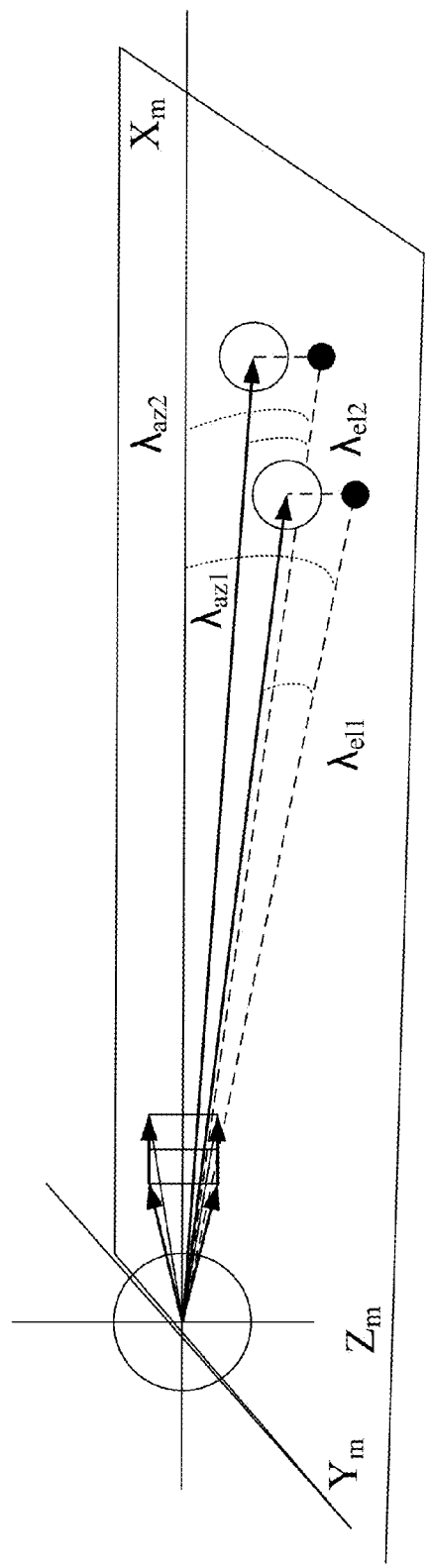
FIG. 50 is yet another, like diagram entitled, "When a camera frame is inertial the LOS rate can be directly measured from the sampled angles"

FIG. 50: When a camera frame is inertial the LOS rate can be directly measured from the sampled angles.

$$\vec{\dot\sigma} = \begin{bmatrix} \lambda_{az2} - \lambda_{az1} \\ \lambda_{el2} - \lambda_{el1} \end{bmatrix} * SampleFrequency$$

Stationary/Rotating Imager

When a camera is rotating about its origin but isn't moving, then we have to put forth a little more effort to determine what sigma dot is. First of all, note that what we are trying to do is determine what the camera would record for the LOS rate if it where stationary, and thus measuring in an inertial frame like above. The reason that a rotating imager doesn't report inertial values is because a rotating imager will artificially induce motion on the image plan. The result is that an object which appears in the bottom corner of an image in one frame can end up in the top of the image frame when the next image is required.

Figure 51:
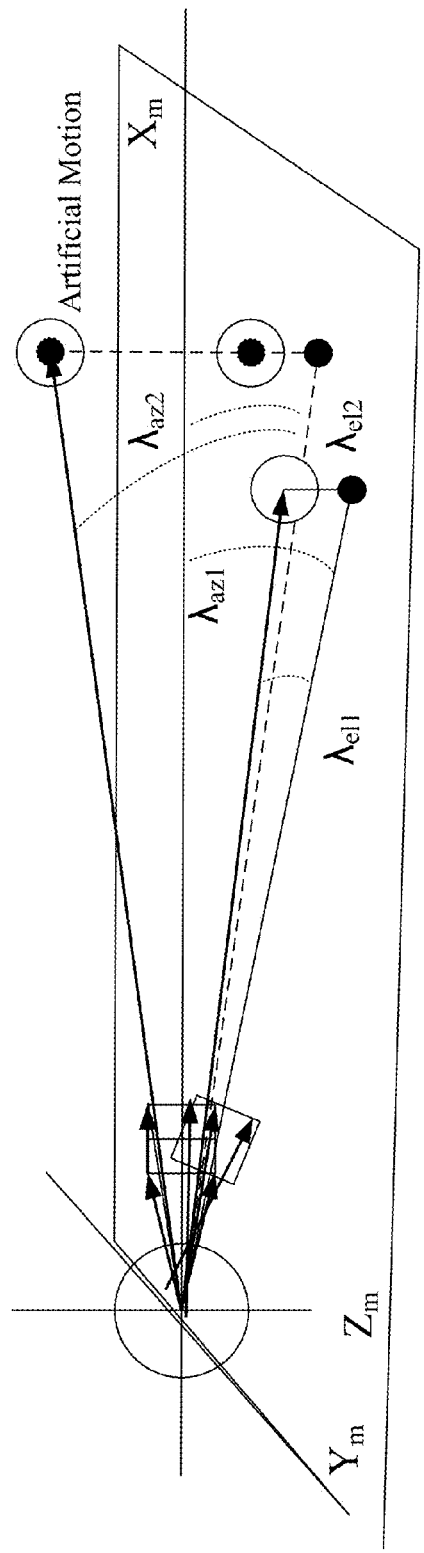
FIG. 51 is still another like diagram entitled, "A rotating imager artificially induces motion on the focal plane"

FIG. 51: A rotating imager artificially induces motion on the focal plane.

To combat this effect, missiles typically use fancy precision gyros and simply remove angular movements (p,q,r) by subtraction so the above equation would become $$\vec{\dot\sigma} = \begin{bmatrix} \lambda_{az2} - \lambda_{az1} \\ \lambda_{el2} - \lambda_{el1} \end{bmatrix} * SampleFrequency - \begin{bmatrix} r \\ q \end{bmatrix}$$

UAV grade MEMs gyros simply aren't good enough to make this calculation effective.

Without the gyros, we will do what Arete does best— register the imagery. In our case a static background will suffice as our inertial backdrop for registration. This is really our airborne version of "Constant Bearing Decreasing Range" NOTE: This will not work with a moving background like the ocean.

To measure the sigma dot vector we register our image to the inertial background, and then examine how far the target moved from one registered frame to another. These deltas divided by the sampling time will tell how many pixels the targets moved in inertial space per frame. To determine sigma dot we have two approaches:

Multiply the pixel deltas by the inverse of the IFOV.

$$\vec{\dot\sigma} = \begin{bmatrix} DeltaY \\ DeltaZ \end{bmatrix} * \frac{SampleFrequency}{IFOV}$$

This approach is fine under the small angle approximation, but for pixel indices far from the center of the imager another approach may be needed:

$$TV_2 = \begin{bmatrix} YpixelIndex_2 \\ ZpixelIndex_2 \\ focalLength \end{bmatrix}$$

$$TV_{1.5} = \begin{bmatrix} YpixelIndex_2 + DeltaY \\ ZpixelIndex_2 \\ focalLength \end{bmatrix}$$

$$TV_1 = \begin{bmatrix} YpixelIndex_2 + DeltaY \\ ZpixwlIndex_2 + DeltaZ \\ focalLength \end{bmatrix}$$

$$\vec{\dot\sigma} = \begin{bmatrix} \cos^{-1}\left[\frac{T\vec{V}_2 \cdot T\vec{V}_{1.5}}{|T\vec{V}_2||T\vec{V}_{1.5}|}\right] \\ \cos^{-1}\left[\frac{T\vec{V}_{1.5} \cdot T\vec{V}_1}{|T\vec{V}_2||T\vec{V}_1|}\right] \end{bmatrix} * SampleFrequency$$

We will have to examine which approach is best during the program.

6DOF Imager

An imager that is moving introduces its own contribution into the $\lambda_{az\ and}\lambda_{el}$ values (Remember the $V_m'/R$ term from earlier). This is where the LOSARE Equation comes from that claims we estimate LOS rate perfectly as $R_g$ gets big. We recover this equation by assuming that we will image quickly enough to make a superposition argument.

Superposition 1: Imager Movement

Figure 52:
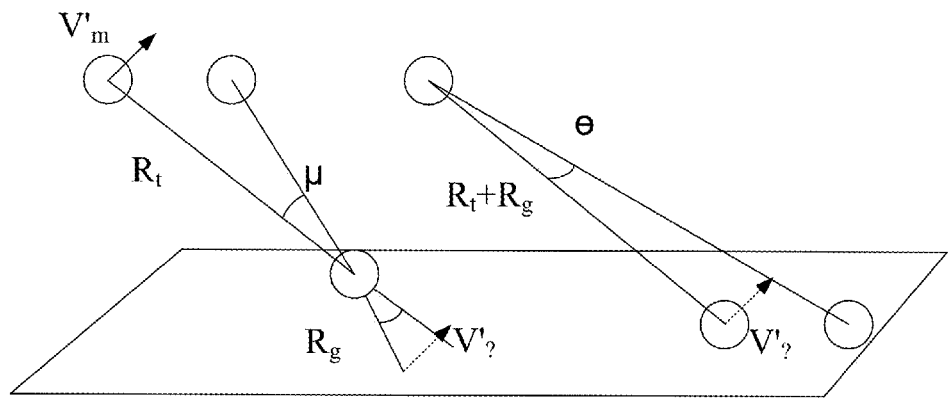
FIG. 52 is another like diagram entitled, "When the imager is moving, LOS rate is affected by a precession effect"
Figure 53:
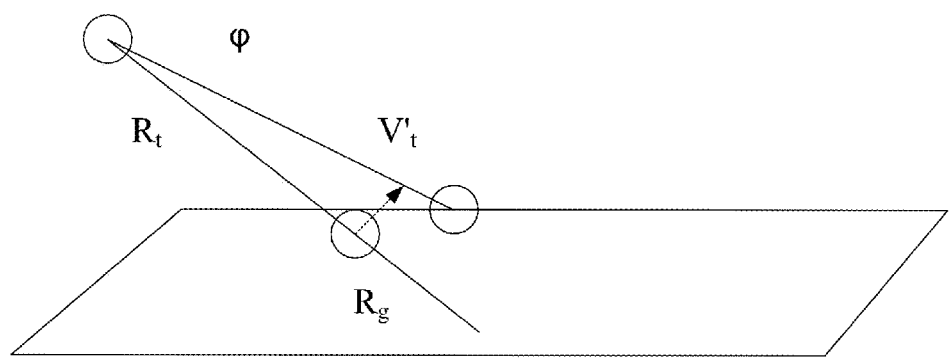
FIG. 53 is a final such diagram entitled, "The Target's contribution is as before."

FIG. 52: When the imager is moving, LOS rate is affected by a precession effect To calculate sigma dot, we first want to understand how the imager's movement affects the perceived movement of a target in the imager's field of view. In other words we want to find out how a theta dot will affect sigma dot.

$$R_t * \dot\mu = \dot V_m$$

$$R_g * \dot\mu = \dot V_?$$

$$R_g * \frac{\dot V_m}{R_t} = \dot V_?$$

$$(R_t + R_g) * \dot\theta = \dot V_?$$

$$\frac{\dot V_m * R_g}{(R_t + R_g) * R_t} = \dot\theta$$

Superposition 2: Target Movement

FIG. 51: The target's contribution is as before.

The contribution to Sigma dot from the target is treated just as it was before.

$$\frac{\dot V_t}{R_t} = \dot\phi$$

Superposition 3: LOSARE Equation

We make the assumption again that the images are registered per the above "Stationary/Rotating Imager" Section, and again determine a sigma dot, but this time we have actually measured the following:

$$\dot{\sigma}' = -\dot{\theta} + \dot{\phi} = -\frac{\dot{V}_m * R_g}{(R_t + R_g) * R_t} + \frac{\dot{V}_t}{R_t}$$

Which we can negate to get $$\dot{\sigma}' = -\dot{\theta} + \dot{\phi} = -\frac{\dot{V}_m * R_g}{(R_t + R_g) * R_t} - \frac{\dot{V}_t}{R_t}$$

This is the equation we say approaches sigma dot as $R_g$ becomes big $$-\dot{\sigma}' = \frac{\dot{V}_m}{R_t} - \frac{\dot{V}_t}{R_t}$$

$$\dot{\sigma}' = \frac{\dot{V}_m}{R_t} - \frac{\dot{V}_t}{R_t}$$

In the accompanying apparatus claims generally the term "such" is used (instead of "said" or "the") in the bodies of the claims when reciting elements of the claimed invention, for referring back to features which are introduced in preamble as part of the context or environment of the claimed invention. When so used, the word "such" is exclusively a special-purpose definite article, not to be mistaken for a noun or a generalizing adjective. This verbal structure also is not to be mistaken for an indication that necessarily there are plural antecedent items. As an example, for purposes of the appended claims use of the phrase "such target" or "such object" reveals that the target or object mentioned in a particular claim is not just "any such target" or "any object having similar character". Rather, the target or object is a specifically mentioned (typically single) object or target, to which reference is made to clarify the relationship between the elements of the claimed combination and that object or target—but which is not itself an element of the invention there claimed. In another claim that is not so worded, a recited "object" or "target" may be an element of the claimed combination. The purpose of this convention is to aid in more distinctly and emphatically pointing out which features are elements of the claimed invention, and which are parts of its context—and thereby to more particularly claim the invention. In some but not all claims employing this nomenclature, the item so identified is also explicitly stated (elsewhere in the claim or the document) to be an element or not an element, as the case may be, of the claimed combination.

The foregoing disclosures are exemplary, not exhaustive or limiting. The character and scope of our invention are to be determined from the appended claims.

We claim:

1. A method for estimating line-of-sight rotation rate for use in tracking, approaching, pursuing, intercepting, or avoiding an object; said method comprising the steps of:
   with an imaging sensor fixed to a vehicle that is approaching or receding from the object, recording a series of images of the object together with a background;
   based on computations made from the images exclusively, with no direct information about inertial angular body rate or gimbal angle, estimating line-of-sight rotation rate of the object relative to the vehicle; and
   applying the estimated line-of-sight rotation rate to track, approach, pursue, intercept or avoid the object.

2. The method of claim 1, wherein:
   the image-recording and rate-estimating steps provide proportional navigation.

3. The method of claim 1, wherein the recording step comprises:
   operating a scan mirror to extend the total field of regard (FOR) of the sensor; and
   notwithstanding the mirror-operating step, still determining the line-of-sight from the images exclusively.

4. The method of claim 1, wherein the recording step comprises:
   operating the sensor as a strapdown sensor on the vehicle.

5. The method of claim 1, wherein the applying step further comprises:
   also incorporating measurement of "range rate over range" determined exclusively from optical flow as between successive images; and
   applying the measured "range rate over range" in combination with the line-of-sight rotation rate, to optimize proportional-navigation guidance loop gain.

6. The method of claim 1, wherein the estimating step further comprises the substeps of:
   evaluating the optical flow between successive frames;
   establishing a rough image registration by applying a first, relatively more-approximate image-registration technique;
   next selecting anchor points for image sequences; and
   then applying a second, relatively finer image-registration technique to establish an output image-registration solution;
   wherein the registration solution is a coordinate translation needed to align inertial surroundings of the object.

7. The method of claim 6, wherein the first image-registration technique comprises:
   operating an optical-flow procedure with efficient embedded registration and mapping; and
   applying a resulting homography matrix to imagery around the object.

8. A method for estimating line-of-sight rotation rate for use in tracking, approaching, pursuing, intercepting, or avoiding an object; said method comprising the steps of:
   operating at least one inexpensive and low-quality inertial rate sensor, to establish a first relatively rough but efficient embedded image registration and mapping;
   based on the first registration, generating a homography matrix;
   with an imaging sensor fixed to a vehicle that is approaching or receding from the object, recording a series of images of the object together with a background;
   based on computations made from the images exclusively, with no direct information about gimbal angle, and with no direct information about inertial angular body rate except as stated in the sensor-operating step above, estimating line-of-sight rotation rate of the object relative to the vehicle; and
   applying the estimated line-of-sight rotation rate to track, approach, pursue, intercept or avoid the object;
   wherein the estimating step further comprises the substeps of:
      evaluating the optical flow between successive frames,
      next selecting anchor points for image sequences; and
      then applying a second, relatively finer image-registration technique to establish an output image-registration solution;

wherein the registration solution is a coordinate translation for aligning the inertial surroundings of the object.

9. Apparatus for estimating line-of-sight rotation rate for use in tracking, approaching, pursuing, intercepting or avoiding an object; said apparatus comprising:
- at least one imaging sensor fixed to a vehicle that is approaching or receding from the object, wherein the vehicle is not a part of the claimed apparatus;
- means for controlling the at least one sensor to record a series of images of such object together with a background;
- means for making computations derived exclusively from the images, with no direct information about inertial angular body rate or gimbal angle, and for thereby estimating line-of-sight rotation rate of such object relative to such vehicle; and
- means for applying the estimated line-of-sight rotation rate to track, approach, pursue, intercept or avoid such object.

10. The apparatus of claim 9, wherein the vehicle is approaching the object, but contrast in the direction of the object is not adequate for highly accurate measurement; and wherein:
- a first sensor, looking forward, receives said series of images of such object and determines what pixel best represents a centroid of such object, thereby identifying an angle of deviation from a centerline of the first sensor; and
- a second sensor, looking aft, receives said series of images of a background scene;
- said angle from the first sensor centerline identifies a pixel in the second sensor as such object location;
- the first and second sensor are precisely aligned; and
- the apparatus comprises means for applying line-of-sight algorithms to the second sensor imagery, substantially as if such object were actually present at the identified pixel in the second, aft sensor.

11. The apparatus of claim 10, wherein:
- the sensor-controlling and computation-making means perform proportional navigation.

12. Apparatus for estimating line-of-sight rotation rate for use in tracking, approaching, pursuing, intercepting or avoiding an object; said apparatus comprising:
- a vehicle approaching or receding from such object;
- at least one imaging sensor fixed to the approaching or receding vehicle;
- means for controlling the sensor to record a series of images of such object together with a background;
- means for making computations derived exclusively from the images, with no direct information about inertial angular body rate or gimbal angle, and for thereby estimating line-of-sight rotation rate of such object relative to the vehicle; and
- means for applying the estimated line-of-sight rotation rate to track, approach, pursue, intercept or avoid such object.

* * * * *